US012264641B2

(12) United States Patent
Pease

(10) Patent No.: US 12,264,641 B2
(45) Date of Patent: Apr. 1, 2025

(54) FUEL VAPORIZER SYSTEM

(71) Applicant: Roger Stephen Pease, Edmond, OK (US)

(72) Inventor: Roger Stephen Pease, Edmond, OK (US)

( * ) Notice: Subject to any disclaimer, the term of this patent is extended or adjusted under 35 U.S.C. 154(b) by 88 days.

(21) Appl. No.: 18/348,919

(22) Filed: Jul. 7, 2023

(65) Prior Publication Data

US 2025/0012243 A1 Jan. 9, 2025

(51) Int. Cl.
*F02M 27/08* (2006.01)

(52) U.S. Cl.
CPC .................................. *F02M 27/08* (2013.01)

(58) Field of Classification Search
CPC . F02M 27/08; F23C 99/003; F23C 2700/026; F23D 11/34; F23D 11/345; F02B 51/00; F02B 51/06
See application file for complete search history.

(56) References Cited

U.S. PATENT DOCUMENTS

| | | | | | |
|---|---|---|---|---|---|
| 3,907,940 | A * | 9/1975 | Thatcher | F02M 27/08 | 261/DIG. 82 |
| 4,388,892 | A * | 6/1983 | Rody | F22B 1/003 | 122/28 |
| 4,699,110 | A * | 10/1987 | Iwano | F02M 11/02 | 123/472 |
| 5,836,289 | A * | 11/1998 | Thring | F02M 53/06 | 123/549 |
| 5,875,765 | A * | 3/1999 | Norton | F02M 25/0854 | 123/520 |
| 6,499,991 | B1 * | 12/2002 | Usami | F23D 11/446 | 431/11 |
| 7,066,156 | B2 * | 6/2006 | Magyari | F02C 3/28 | 123/538 |
| 8,495,990 | B1 * | 7/2013 | Rivera | F02M 27/08 | 123/538 |
| 2003/0234455 | A1 * | 12/2003 | Mieney | B05B 7/0012 | 261/76 |

* cited by examiner

*Primary Examiner* — Grant Moubry
(74) *Attorney, Agent, or Firm* — DUNLAP CODDING, P.C.

(57) ABSTRACT

Fuel vaporizers and methods of use are disclosed herein. The fuel vaporizer comprises a housing, a fuel absorber, and an ultrasonic transducer. The housing defines a fuel absorption chamber, an equalization chamber, a fuel inlet port, and a fuel outlet port. The fuel inlet port is in fluid communication with the fuel absorption chamber. The fuel outlet port is in fluid communication with the equalization chamber. The fuel absorber is positioned within the fuel absorption chamber. The ultrasonic transducer is in contact with the fuel absorber and is positioned between the fuel absorption chamber and the equalization chamber.

20 Claims, 14 Drawing Sheets

FUEL VAPORIZER SYSTEM

FEDERALLY SPONSORED RESEARCH AND DEVELOPMENT

Not applicable.

CROSS-REFERENCE TO RELATED APPLICATIONS

Not applicable.

BACKGROUND OF THE INVENTION

Consumers who utilize fossil fuel desire higher fuel efficiency for combustion engines such as those included in automobiles, small engine equipment, and shipping transportation. Technological advancements to meet this desire have primarily involved structural redesign of the vehicle and combustion engine and include, for example, reducing the size of the vehicle's body, improving the vehicle's aerodynamics, enhancing the combustion engine's air intake, and introducing computerized systems or fuel injection systems. Combustion engines used in agricultural equipment have also seen improvements to cam and valve efficiency and exhaust and intake operation, as well as the use of various types of biofuels.

Another focus of technological improvement involves the combustion characteristics of fuel. It is known that liquid fuel itself is not actually ignited or burned; rather, only the vapors that are formed from the liquid fuel are ignited and burned. In conventional combustion engines, only about 10-20% of the fuel is in vapor form prior to introduction to the combustion chamber; this small percentage is what is actually burned in the combustion chamber, while the remaining 80-90% of the fuel is expelled out of the exhaust system as waste in the form of hydrocarbons. Catalytic converters on vehicles manufactured after 1975 break down a portion of the waste before the remaining waste is released into the atmosphere; however, this portion of the waste is not used to the benefit of the combustion engine's energy output. On exhaust systems without catalytic converters, such as small engines for equipment, motorcycles, all-terrain vehicles, and agricultural vehicles, the unconsumed fuel is released directly to the atmosphere in the form of hydrocarbons.

Yet another focus of technological improvement involves the conditioning of fuel via pressurization and vaporization, which can allow a combustion engine to utilize a larger percentage of the fuel more effectively, thereby increasing energy efficiency during combustion. Aircraft jet engines, for example, utilize both pressurization and heating of fuel to achieve close to 100% efficiency in liquid fuel usage. Generally, vaporizing systems use thermal energy from the combustion engine's exhaust manifold or block heating system. Some such systems utilize electrical energy from the battery, alternator, or generator to power a heating element such as resistance wire or microwaves to rapidly expand the fuel molecules.

Vaporizing systems generally transmit thermal energy to the fuel prior to the fuel entering the combustion chamber in a number of different ways. The most common are thermal mist vaporizers, thermal boiler systems, and ultrasonic vaporizers. Mist vaporizing systems are designed to atomize the liquid fuel into a mist form by applying heat. Such systems are based on the fact that mist has a much greater surface area, which makes it easier to convert the mist into a vapor. Unfortunately, such systems are often not operational until after the combustion engine has reached a nominal operating temperature; that is, unless an electrical heating element is used. This causes atomized fuel to pool at the output before the combustion engine has reached the nominal operating temperature, which may foul the system. Thermal vaporizing systems also pose another issue: by raising the temperature of the fuel to a level just below the fuel's flashpoint, such systems increase the potential for a hazardous combustion to occur within the system. Design modifications attempting to address this issue may be found in several existing systems.

One system that attempts to address the aforementioned flashpoint issue is a "Closed-Circuit Fuel Vapor System" described by Hansen (U.S. Pat. No. 4,524,746). Hansen describes a system comprising a vaporizing chamber surrounded by cooling fins and housing an ultrasonic transducer. Fuel is converted from a liquid form to a vapor form via high frequency vibrations. The vaporized fuel is passed from the vaporizer chamber through a venturi to a lower chamber of a pre-heater. The vaporized fuel is then introduced to a suitable hot medium, such as hot water from the engine. The density of the vaporized fuel is regulated with a gas vapor detector sensor and centrifugal pump. When the vaporized fuel reaches a pre-set density, the ultrasonic transducer is turned off and the vaporized fuel is transferred to the intake manifold of the engine. However, the system described by Hansen is not completely functional until the internal temperature of the engine raises enough to meet the preheating requirement for sustained vapor production. The system is therefore unavailable to use until the engine has reached an optimal operational temperature, which may never occur depending on, for example, the outside temperature.

Another system that attempts to address the aforementioned flashpoint issue is a system for vaporizing liquid fuel described by Magyari (U.S. Pat. No. 7,066,156). Magyari describes a fuel vaporization system using photonic energy to vaporize liquid fuel. A preferred embodiment of the system comprises a vaporization chamber and at least one laser source for imparting an energy beam onto a portion of the vaporization chamber to vaporize liquid fuel flowing through the portion of the vaporization chamber. The energy beam can be comprised of a beam of ultraviolet light. Another preferred embodiment of the system uses an infrared energy source to add thermal energy to liquid fuel droplets generated by a misting nozzle. However, the use of either type of laser could cause the vaporized fuel to reach the fuel's flashpoint. Another preferred embodiment of the system draws or blows liquid fuel across a cold ion discharge or cold plasma chamber to subject the liquid fuel to an electric field. The liquid fuel absorbs energy from the electric field so that vaporized fuel exits the cold ion discharge or cold plasma chamber. However, the vaporized fuel could condense into a liquid form before reaching the intake manifold of the engine due to losing charge through transfer in the conduit.

Accordingly, there is a desire for a fuel vaporization system which does not create a potential for hazardous combustion and which does not allow vaporized fuel to pool or condense while the temperature remains below the ambient temperature.

SUMMARY OF THE INVENTION

The desire for a fuel vaporization system which does not create a potential for hazardous combustion and which does not allow vaporized fuel to pool or condense while the temperature remains below the ambient temperature is addressed by a fuel supply system comprising a fuel vaporizer which does not include a heating element or heating chamber and which separates liquid fuel from vaporized fuel within the fuel vaporizer.

In one aspect, the present disclosure relates to a fuel vaporizer, comprising: a housing defining a fuel absorption chamber, an equalization chamber, a fuel inlet port in fluid communication with the fuel absorption chamber, and a fuel outlet port in fluid communication with the equalization chamber; a fuel absorber positioned within the fuel absorption chamber; and an ultrasonic transducer in contact with the fuel absorber and positioned between the fuel absorption chamber and the equalization chamber.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
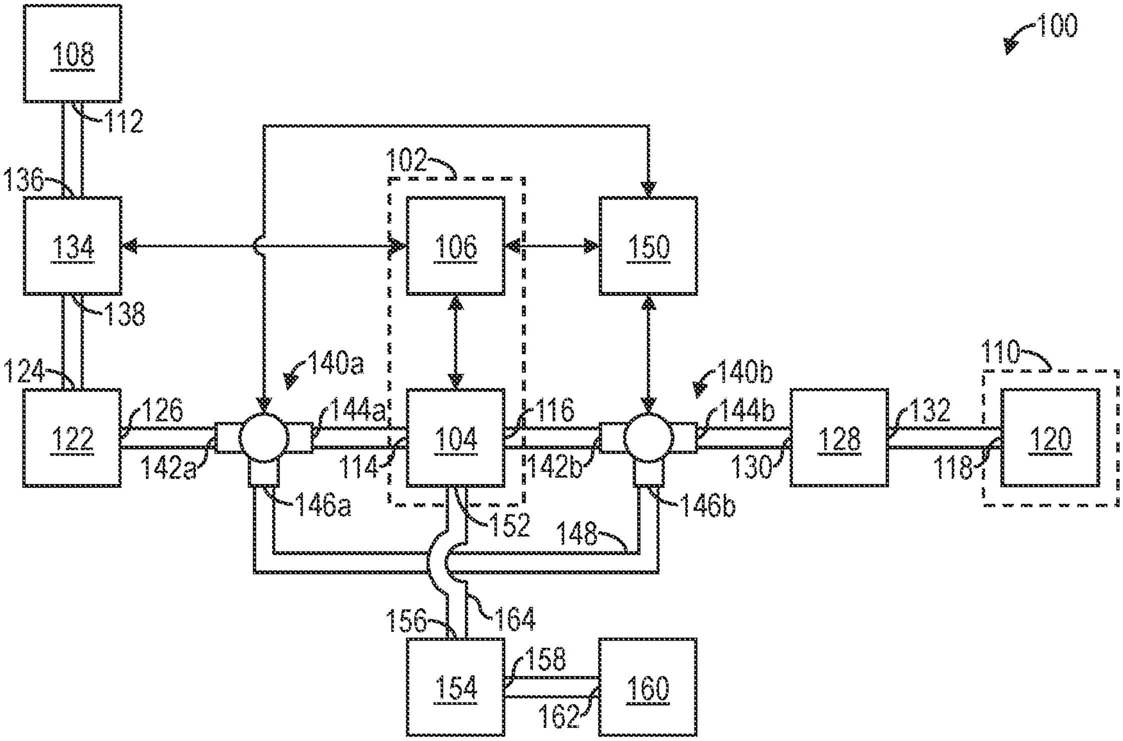
FIG. 1 is a block diagram of an exemplary fuel vaporization system constructed in accordance with the present disclosure.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Headings are provided for convenience only and are not to be construed to limit the invention in any manner. Embodiments illustrated under any heading or in any portion of the disclosure may be combined with embodiments illustrated under the same or any other heading or other portion of the disclosure. Any combination of the elements described herein in all possible variations thereof is encompassed by the invention unless otherwise indicated herein or otherwise clearly contradicted by context.

Unless otherwise required by context, singular terms shall include pluralities and plural terms shall include the singular, with the exception that the term "plurality" as used herein, does not include the singular.

All patents or published patent applications referenced in any portion of this application are herein expressly incorporated by reference in their entirety to the same extent as if each individual patent or publication was specifically and individually indicated to be incorporated by reference.

All of the assemblies, systems, kits, and/or methods disclosed herein can be made and executed without undue experimentation in light of the present disclosure. Where a method claim does not specifically state in the claims or description that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." The term "plurality" refers to "two or more."

The use of the term "at least one" will be understood to include one as well as any quantity more than one. In addition, the use of the term "at least one of X, Y, and Z" will be understood to include X alone, Y alone, and Z alone, as well as any combination of X, Y, and Z.

The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive.

The term "fuel" as used herein refers to any substance that is burned to produce heat and power, such as: gasoline; kerosene or paraffin oil; diesel oil; biofuel or plant-based fuel, such as ethanol; white gas such as fuel manufactured by The Coleman Company, Inc., having its principal place of business in Chicago, Illinois; motor oil, including used motor oil; or jet fuel.

Referring now to the drawings and in particular to FIG. 1, shown therein is a block diagram of an exemplary fuel supply system 100 (hereinafter the "system 100") constructed in accordance with the present disclosure. The system 100 may be a gravity-fed system or an electric pump-fed system. The system 100 generally comprises a fuel vaporization assembly 102 comprising a fuel vaporizer 104 and control circuitry 106, wherein the fuel vaporizer 104 is positioned between a fuel supply 108 and an internal combustion engine 110 (hereinafter the "engine 110"), which may be an automotive engine and/or a component of a vehicle. The vehicle may be, for example, an automobile, motorcycle, all-terrain vehicle, agricultural vehicle, locomotive, watercraft, or aircraft. Alternatively, in some embodiments, in place of the engine 110 is an oil burner or an oil heater.

The fuel supply 108 may include a fuel supply outlet 112 in fluid communication with a fuel inlet port 114 of the fuel vaporizer 104. The fuel supply 108 may be configured to provide the fuel vaporizer 104 with liquid fuel. The fuel vaporizer 104 may include a fuel outlet port 116 in fluid communication with an engine inlet 118 (i.e., an intake manifold) of the engine 110. The engine inlet 118 may be in fluid communication with a combustion chamber 120 of the engine 110. The combustion chamber 120 may be configured to ignite vaporized fuel provided thereto. The making and use of an intake manifold and a combustion chamber 120 within an engine 110 is well-known. Thus, no further details are deemed necessary herein.

In some implementations, a fuel filter 122 may be positioned between the fuel supply 108 and the fuel vaporizer 104. The fuel filter 122 may include a fuel filter inlet 124 in fluid communication with the fuel supply outlet 112 of the fuel supply 108 and a fuel filter outlet 126 in fluid communication with the fuel inlet port 114 of the fuel vaporizer 104. The fuel filter 122 may be configured to remove impurities from the liquid fuel. The fuel filter 122 may be, for example, a primary fuel filter, a secondary fuel filter, a cannister fuel filter, a cartridge fuel filter, a spin-on fuel filter, an inline fuel filter, or an in-take fuel filter.

In some implementations, a carburetor 128 may be positioned between the fuel vaporizer 104 and the engine 110. The carburetor 128 may include a carburetor inlet 130 (i.e., an inlet hose) in fluid communication with the fuel outlet port 116 of the fuel vaporizer 104 and a carburetor outlet 132 in fluid communication with the engine inlet 118 of the engine 110. The carburetor 128 may be configured to adjust an amount of air mixed with the vaporized fuel before the vaporized fuel is provided to the engine 110.

In some implementations where the system 100 is an electric pump-fed system, a fuel pump 134 may be positioned between the fuel supply 108 and the fuel filter 122. The fuel pump 134 may have a fuel pump inlet 136 in fluid communication with the fuel supply outlet 112 of the fuel supply 108 and a fuel pump outlet 138 in fluid communication with the fuel inlet port 114 of the fuel vaporizer 104. The fuel pump 134 may be configured to provide the liquid fuel under pressure to the fuel filter inlet 124 of the fuel filter 122 or the fuel inlet port 114 of the fuel vaporizer 104.

In some implementations, the system 100 may include a first three-way valve 140*a* and a second three-way valve 140*b* (the first three-way valve 140*a* and the second three-way valve 140*b*, collectively the "three-way valves 140"). The first three-way valve 140*a* may be positioned between the fuel supply 108 and the fuel vaporizer 104. In the implementation shown, the first three-way valve 140*a* is positioned between the fuel filter 122 and the fuel vaporizer 104; however, in other implementations, the first three-way valve 140*a* may be positioned anywhere between the fuel supply 108 and the fuel vaporizer 104. The second three-way valve 140*b* may be positioned between the fuel vaporizer 104 and the engine 110. In the implementation shown, the second three-way valve 140*b* is positioned between the fuel vaporizer 104 and the carburetor 128; however, in other implementations, the second three-way valve 140*b* may be positioned anywhere between the fuel vaporizer 104 and the engine 110.

The first three-way valve 140*a* may include: a first valve port 142*a* in fluid communication with one of the fuel supply outlet 112 of the fuel supply 108, the fuel pump outlet 138 of the fuel pump 134, or the fuel filter outlet 126 of the fuel filter 122; a second valve port 144*a* in fluid communication with the fuel inlet port 114 of the fuel vaporizer 104; and a third valve port 146*a* in fluid communication with a third valve port 146*b* of the second three-way valve 140*b*. The second three-way valve 140*b* may include: a first valve port 142*b* in fluid communication with the fuel outlet port 116 of the fuel vaporizer 104; a second valve port 144*b* in fluid communication with one of the carburetor inlet 130 of the carburetor 128 and the engine inlet 118 of the engine 110; and the third valve port 146*b* in fluid communication with the third valve port 146*a* of the first three-way valve 140*a*.

The three-way valves 140 may be movable between a first position and a second position. With the three-way valves 140 in the first position, the liquid fuel may flow into the first valve port 142*a* of the first three-way valve 140*a*, out from the second valve port 144*a* of the first three-way valve 140*a*, through the fuel vaporizer 104, into the first valve port 142*b* of the second three-way valve 140*b*, and out of the second valve port 144*b* of the second three-way valve 140*b*. With the three-way valves 140 in the second position, the liquid fuel may flow into the first valve port 142*a* of the first three-way valve 140*a*, out from the third valve port 146*a* of the first three-way valve 140*a*, into the third valve port 146*b* of the second three-way valve 140*b*, and out of the second valve port 144*b* of the second three-way valve 140*b*, thereby bypassing the fuel vaporizer 104 and providing the liquid fuel to one of the carburetor inlet 130 and the engine inlet 118.

Two or more of the fuel vaporizer 104, the fuel supply 108, the engine 110, the fuel filter 122, the carburetor 128, the fuel pump 134, and the three-way valves 140 may be connected to each other by one or more fuel line 148 (hereinafter the "fuel lines 148") that permit fluid communication between the various components of the system 100. The fuel lines 148 may be any manner of hosing, tubing, piping, or conduit that is rated for carrying fuel.

As discussed further below, the control circuitry 106 may be configured to perform one or more of the fuel vaporization operations described herein. In some implementations, the control circuitry 106 may be in electronic communication with an engine controller 150 of the vehicle and/or the fuel pump 134. In some implementations, the three-way valves 140 may be electronically-actuated valves in electronic communication with the engine controller 150 such that the engine controller 150 may cause the three-way valves 140 to move between the first position and the second position.

The engine controller 150 may be an engine computer, a mechanical or electronic throttle sensor, or an idler, for example. The engine controller 150 may transmit signals to the control circuitry 106 indicative of a throttle position (i.e., a demand of the engine 110 for the fuel) to cause the fuel vaporizer 104 to increase or decrease production of vaporized fuel in order to meet the demand of the engine 110.

As discussed further below, in implementations where the engine controller 150 is an engine computer, the control circuitry 106 may transmit signals to the engine controller 150 indicative of a fuel level of the fuel within the fuel absorption chamber 304 (shown in FIG. 3) or signals indicative of the fuel level of the fuel within the fuel absorption chamber 304 being above a predetermined threshold. In implementations where the engine 110 is an engine having a fuel injection system, the control circuitry 106 may transmit signals to the engine controller 150 in order to cause the engine controller 150 to open fuel injectors on a fuel manifold of the engine 110.

As discussed further below, the fuel vaporizer 104 may be provided with an air inlet port 152. Further, the system 100 may comprise an air pump 154 having an air pump outlet 156 in fluid communication with the air inlet port 152 of the fuel vaporizer 104. The air pump 154 may be configured to provide air under pressure to the air inlet port 152. The air pump 154 may further comprise an air pump inlet 158.

In some implementations, the system 100 further comprises an air supply 160 having an air supply outlet 162 in fluid communication with the air pump inlet 158 of the air pump 154. The air supply 160 may be configured to provide the fuel vaporizer 104 with the air. In other implementations, the system 100 lacks the air supply 160 and the air pump inlet 158 and instead receives the air from the ambient.

Two or more of the fuel vaporizer 104, the air pump 154, and the air supply 160 may be connected to each other by one or more air line 164 (hereinafter the "air lines 164") that permit fluid communication between the various components of the system 100. The air lines 164 may be hosing, tubing, piping, or conduit.

The pressure at which the air is provided by the air pump 154 to the air inlet port 152 may vary depending on the implementation of the engine 110. For example, in implementations where the engine 110 is a gasoline engine, the pressure may be between 30 psi and 80 psi on average; in implementations where the engine 110 is a diesel engine, the pressure may be between 10,000 psi and 30,000 psi on average; in implementations where the engine 110 is an aircraft engine, the pressure may be between 150 psi and 1,800 psi on average.

Figure 2A:
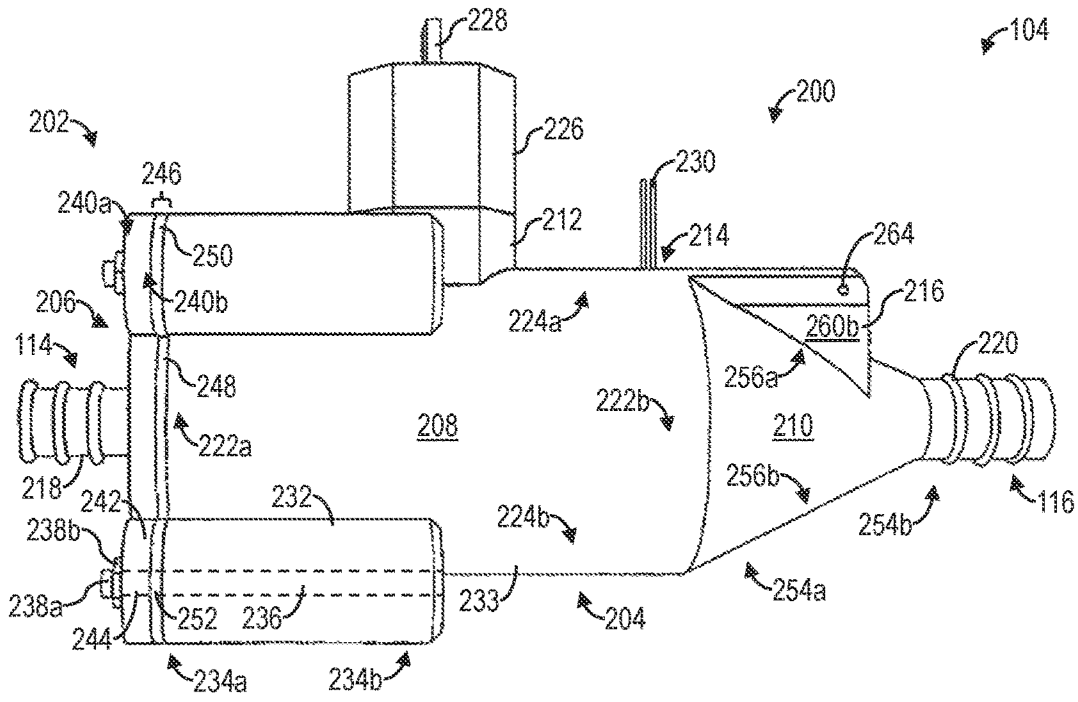
FIG. 2A is a side view of a fuel vaporizer shown in FIG. 1.
Figure 2B:
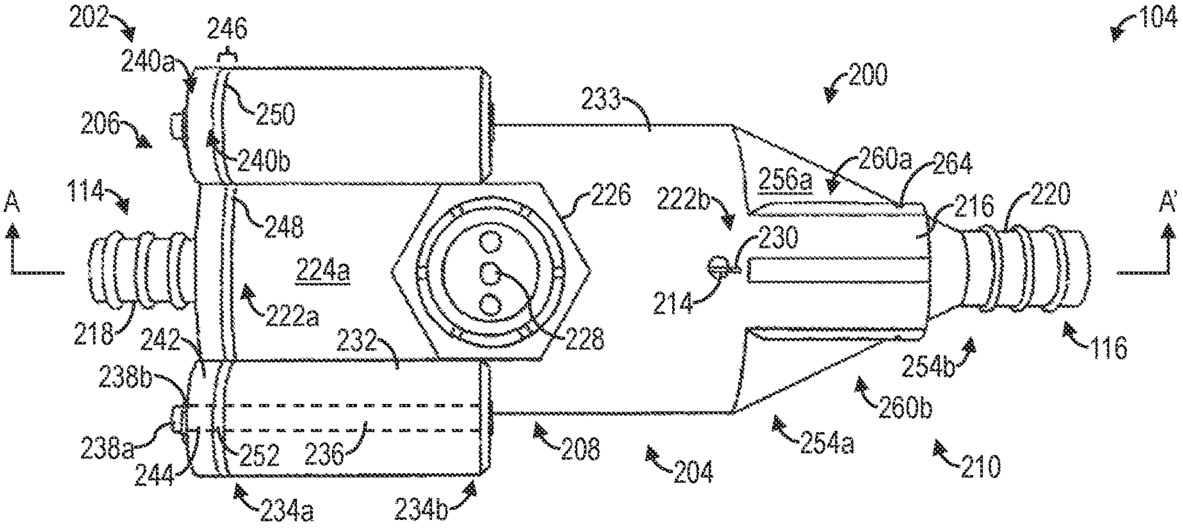
FIG. 2B is a top view of the fuel vaporizer shown in FIG. 1.

Referring now to FIGS. 2A-2B, shown therein is an exemplary implementation of the fuel vaporizer 104. In the implementation shown, the fuel vaporizer 104 is configured to be used in a gravity-fed system; however, in other implementations, such as the implementation shown in FIGS. 7A-7B, the fuel vaporizer 104 is configured to be used in an electric pump-fed system. The fuel vaporizer 104 generally comprises a housing 200, which includes a fuel inlet sub-housing 202 and a main body sub-housing 204. The fuel inlet sub-housing 202 may have a central portion 206 from which the fuel inlet port 114 extends. The main body sub-housing 204 may have a tubular portion 208 and a taper portion 210. The tubular portion 208 may define a fuel level sensor port 212 and one or more transducer lead opening 214 (hereinafter the "transducer lead openings 214"). The taper portion 210 may define an air intake module 216 and the fuel outlet port 116. In some implementations where the fuel vaporizer 104 is configured to be used in a gravity-fed system, the fuel level sensor port 212 may be closed off or plugged.

The fuel inlet port 114 may be sized and dimensioned to be received by one of the fuel supply outlet 112 of the fuel supply 108, the fuel pump outlet 138 of the fuel pump 134, the fuel filter outlet 126 of the fuel filter 122, the second valve port 144*a* of the first three-way valve 140*a*, and/or the fuel lines 148, and may have a ribbed outer surface 218 configured to assist in securing the fuel inlet port 114 to one of the fuel supply outlet 112, the fuel pump outlet 138, the fuel filter outlet 126, the second valve port 144*a*, and/or the fuel lines 148.

The fuel outlet port 116 may be sized and dimensioned to be received by one of the first valve port 142*b* of the second three-way valve 140*b*, the carburetor inlet 130 of the carburetor 128, the engine inlet 118 of the engine 110, and/or the fuel lines 148, and may have a ribbed outer surface 220 configured to secure the fuel outlet port 116 to one of the first valve port 142*b*, the carburetor inlet 130, the engine inlet 118, and/or the fuel lines 148.

The tubular portion 208 of the main body sub-housing 204 may define a fuel absorption chamber 304 (shown in FIG. 3), the tubular portion 208 having an inlet end 222*a*, an outlet end 222*b* opposing the inlet end 222*a*, a top side 224*a*, and a bottom side 224*b* opposing the top side 224*a*. The inlet end 222*a* may define an opening 340 (shown in FIG. 3) in fluid communication with the fuel absorption chamber 304.

The fuel level sensor port 212 may extend from the top side 224*a* of the tubular portion 208 and may have a fuel level sensor opening 344 (shown in FIG. 3) in fluid communication with the fuel absorption chamber 304. The fuel level sensor opening 344 may be sized and dimensioned to receive a fuel level sensor 226, which may assist in maintaining a pressure level within the fuel absorption chamber 304 below a predetermined pressure level.

The fuel level sensor 226 may have one or more fuel level sensor lead 228 (hereinafter the "fuel level sensor leads 228") extending therefrom for carrying electrical signals to and from the fuel level sensor 226. The fuel level sensor 224 may be configured to determine a fuel level of the liquid fuel contained within the fuel absorption chamber 304 and generate a fuel level signal 632 (shown in FIG. 6) indicative of the fuel level. The fuel level sensor 224 may be a single-point level switch, such as a single-point level switch developed and manufactured by Gems Sensors, Inc., having its principal place of business in Plainville, Connecticut, and having the product designation 224503, for example. The fuel level sensor leads 228 may be in electronic communication with the control circuitry 106 such that control signals may be sent from the control circuitry 106 to the fuel level sensor 224 and the fuel level signal 632 may be sent from the fuel level sensor 224 to the control circuitry 106.

The transducer lead openings 214 may be formed in the top side 224*a* of the tubular portion 208 adjacent to the outlet end 222*b* and may be in fluid communication with the fuel absorption chamber 304. However, in some implementations, the transducer lead openings 214 may be formed in other portions of the tubular portion 208. The transducer lead openings 214 may be sized and dimensioned to receive one or more transducer lead 230 (hereinafter the "transducer leads 230") for carrying electrical signals to and from an ultrasonic transducer 360 (shown in FIG. 3) (hereinafter the "transducer 360"), which may be contained within the fuel absorption chamber 304. The transducer leads 230 may be in electronic communication with the control circuitry 106 such that control signals may be sent from the control circuitry 106 to the transducer 360.

The main body sub-housing 204 may include one or more attachment assembly 232 (hereinafter the "attachment assemblies 232") configured to securely attach the fuel inlet sub-housing 202 to the main body sub-housing 204. In the implementation shown, the main body sub-housing 204 includes four attachment assemblies 232 spatially disposed on an outer surface 233 of the tubular portion 208 adjacent to the inlet end 222*a* of the tubular portion 208.

Each of the attachment assemblies 232 may have a first end 234*a*, a second end 234*b* opposing the first end 234*a*, and a hole 236 extending from the first end 234*a* to the second end 234*b*. The first end 234*a* of each of the attachment assemblies 232 may be coplanar with the inlet end 222*a* of the main body sub-housing 204.

A portion of each of the attachment assemblies 232 defining the hole 236 may be threaded and configured to engage, for example, a machine screw 238*a*. However, in some implementations, the portion of each of the attachment assemblies 232 defining the hole 236 may be smooth. The machine screw 238*a* may be secured in place by, for example, a machine screw nut 238*b*, which may be provided either alone or in combination with a machine screw washer 238*c* (shown in FIG. 4). For purposes of clarity, only one of the attachment assemblies 232, the first ends 234*a*, the second ends 234*b*, the holes 236, the machine screws 238*a*, and the machine screw nuts 238*b* is labeled with a reference character.

The central portion 206 of the fuel inlet sub-housing 202 may have a first side 240*a*, a second side 240*b* opposing the first side 240*a*, and one or more attachment leaf 242 (hereinafter the "attachment leaves 242") configured to securely attach the fuel inlet sub-housing 202 to the main body sub-housing 204, each of the attachment leaves 242 defining a hole 244 extending from the first side 240*a* to the second side 240*b*. In the implementation shown, the fuel inlet sub-housing 202 includes four attachment leaves 242 spatially disposed around the central portion 206.

The central portion 206 of the fuel inlet sub-housing 202 may cover the inlet end 222*a* of the main body sub-housing 204 so as to seal the inlet end 222*a* from the surrounding environment. The first side 240*a* may be an external surface out from which the fuel inlet port 114 extends, and the second side 240*b* may face the fuel absorption chamber 304. The hole 244 of each of the attachment leaves 242 may align with the hole 236 of respective ones of the attachment assemblies 232. A portion of each of the attachment leaves 242 defining the hole 244 may be threaded and configured to engage, for example, the machine screw 238*a*. However, in some implementations, the portion of each of the attachment leaves 242 defining the hole 244 may be smooth. For purposes of clarity, only one of the attachment leaves 242 and the holes 244 is labeled with a reference character.

A gasket 246 may be positioned between the fuel inlet sub-housing 202 and the main body sub-housing 204. The gasket 246 may have a central portion 248 and one or more attachment leaf 250 (hereinafter the "attachment leaves 250"), each of the attachment leaves 250 defining a hole 252 extending therethrough. The hole 252 of each of the attachment leaves 250 may align with the hole 244 of respective ones of the attachment leaves 242 and the hole 236 of respective ones the attachment assemblies 232. For purposes of clarity, only one of the attachment leaves 250 and the holes 252 is labeled with a reference character.

The taper portion 210 of the main body sub-housing 204 may define the air intake module 216 and the fuel outlet port 116. The taper portion 210 may define an equalization chamber 308 (shown in FIG. 3) in fluid communication with the fuel absorption chamber 304, the taper portion 210 having an inlet end 254*a*, an outlet end 254*b* opposing the inlet end 254*a*, a top side 256*a*, and a bottom side 256*b* opposing the top side 256*a*. The air intake module 216 may extend from the top side 256*a* of the taper portion 210. The fuel outlet port 116 may extend from the outlet end 254*b* of the taper portion 210. As discussed further below, the air intake module 216 may have a first side 260*a*, a second side 260*b* opposing the first side 260*a*, and a hole 264 extending from the first side 260*a* to the second side 260*b*. As discussed further below, a pin 392 (shown in FIG. 3) may be disposed in the hole 264 for movably attaching an air intake flap 390 (shown in FIG. 3) to the air intake module 216.

Figure 3:
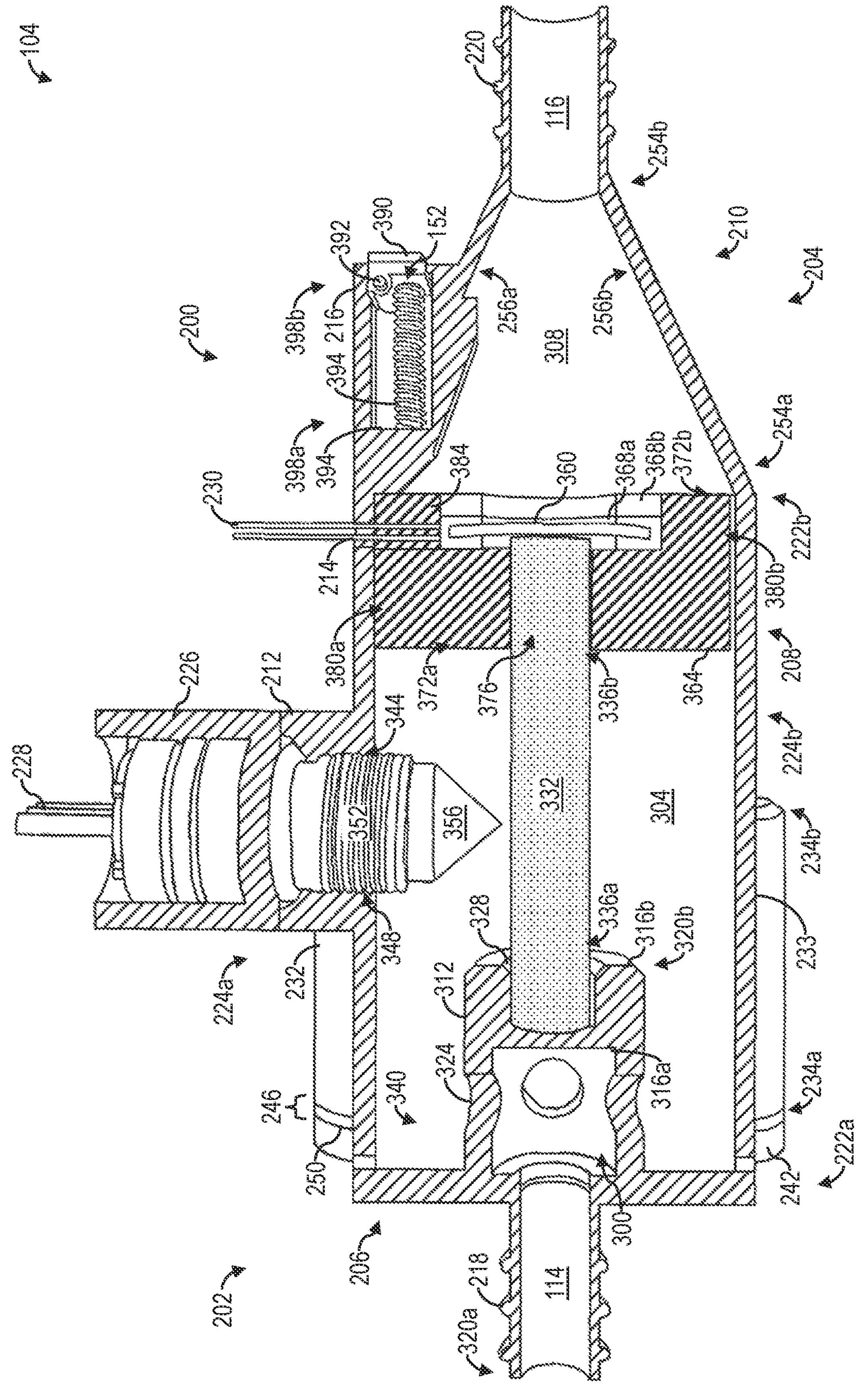
FIG. 3 is a partial cross-sectional view of the fuel vaporizer shown in FIG. 2B, taken along the line A-A' and in the direction of the arrows.
Figure 4:
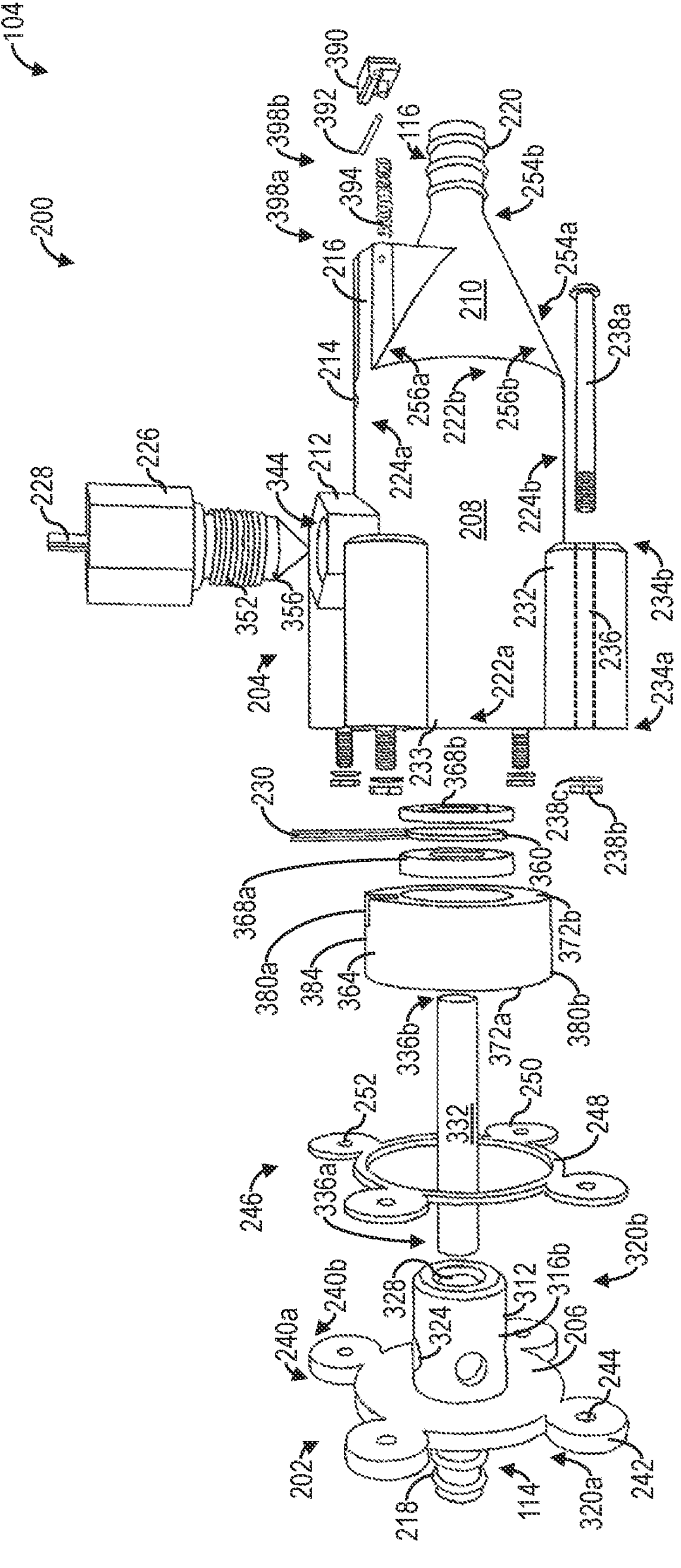
FIG. 4 is an exploded side view of the fuel vaporizer shown in FIG. 1.

Referring now to FIGS. 3 and 4, the housing 200 of the fuel vaporizer 104 may further define a plurality of internal chambers, including, for example, a fuel introduction chamber 300, the fuel absorption chamber 304, and the equalization chamber 308.

The fuel inlet sub-housing 202 may further include a fuel introduction portion 312 extending from the second side 240*b* of the central portion 206. The fuel introduction portion 312 may have an inner surface 316*a*, an outer surface 316*b* opposing the inner surface 316*a*, an inlet end 320*a*, an outlet end 320*b* opposing the inlet end 320*a*, and one or more opening 324 (hereinafter the "openings 324") extending from the inner surface 316*a* to the outer surface 316*b*. In the implementation shown, the fuel introduction portion 312 includes four openings 324 spatially disposed around the fuel introduction portion 312. For purposes of clarity, only one of the openings 324 is labeled with a reference character.

The inner surface 316*a* may define the fuel introduction chamber 300. The fuel inlet port 114 may be in fluid communication with the fuel introduction chamber 300, which may be in fluid communication with the fuel absorption chamber 304 via the openings 324. An indentation 328 may be provided in the outer surface 316*b* of the fuel introduction portion 312 adjacent to the outlet end 320*b*.

Liquid fuel provided by the fuel supply 108 may enter the fuel vaporizer 104 via the fuel inlet port 114 and flow into the fuel introduction chamber 300. The liquid fuel may then flow through the openings 324 and into the fuel absorption chamber 304.

A fuel absorber 332 may be positioned within the fuel absorption chamber 304 and may be configured to absorb at least a portion of the liquid fuel in the fuel absorption chamber 304. The fuel absorber 332 may have a first end 336*a* and a second end 336*b* opposing the first end 336*a*. The first end 336*a* may be inserted into the indentation 328 provided in the outer surface 316*b* of the fuel introduction portion 312, which may assist in securing the fuel absorber 332 in position in the fuel absorption chamber 304. The fuel absorber 332 may be constructed using an absorbent material and/or a hydrophilic material, such as cotton, linen, rayon, wool, polyester, fiberglass, synthetic fiber such as KEVLAR® manufactured by DuPont de Nemours, Inc., having its principal place of business in Wilmington, Delaware, and/or combinations thereof. The fuel absorption chamber 304 may be un-pressurized or may be subject to a small amount of added pressure (e.g., +2 psi above atmospheric pressure) created by the fuel pump 134.

As referenced above, the inlet end 222*a* of the tubular portion 208 of the main body sub-housing 204 may define the opening 340 in fluid communication with the fuel absorption chamber 304. When the fuel inlet sub-housing 202 is attached to the main body sub-housing 204, with the gasket 246 preferably disposed therebetween, the central portion 206 of the fuel inlet sub-housing 202 may serve to close the opening 340 such that liquid fuel may not escape the fuel absorption chamber 304.

As referenced above, the fuel level sensor port 212 may extend from the top side 224*a* of the tubular portion 208 of the main body sub-housing 204, and the fuel level sensor port 212 may have the fuel level sensor opening 344 in fluid communication with the fuel absorption chamber 304. As further referenced above, the fuel level sensor opening 344 may be sized and dimensioned to receive the fuel level sensor 226. Accordingly, the fuel level sensor opening 344 may have a threaded inner surface 348 configured to engage a threaded portion 352 of the fuel level sensor 226. The fuel level sensor 226 may have a probe portion 356 extending into the fuel absorption chamber 304 configured to determine a fuel level of the fuel in the fuel absorption chamber 304.

As referenced above, the transducer 360 may be contained within the fuel absorption chamber 304, and the transducer leads 230 may carry control signals from the control circuitry 106 to the transducer 360. The transducer 360 may be disklike in shape and may be secured in place by a transducer holder 364 and a transducer retaining ring having a first portion 368*a* and a second portion 368*b* (collectively the "transducer retaining ring 368"). The transducer retaining ring 368 may be ringlike in shape and may be constructed using, for example, silicone, neoprene, nitrile rubber, or cork.

The transducer holder 364 may be positioned adjacent to the outlet end 222*b* of the fuel absorption chamber 304 such that the transducer holder 364 separates the fuel absorption chamber 304 and the equalization chamber 308. The transducer holder 364 may have a first side 372*a*, a second side 372*b* opposing the first side 372*a*, a hole 376 extending from the first side 372*a* to the second side 372*b*, a top side 380*a*, a bottom side 380*b* opposing the top side 380*a*, and a transducer lead slot 384 extending from the top side 380*a* to the hole 376. The second end 336*b* of the fuel absorber 332 may be positioned within the hole 376 to support the second end 336*b*. In some embodiments, the second end 336*b* of the fuel absorber 332 may be sized and dimensioned to securely fit within the hole 376 and form a seal to prevent the fuel from passing through the hole 376 other than through the fuel absorber 332.

The transducer 360 may be in contact with the fuel absorber 332 such that, when an electric signal causes the transducer 360 to vibrate, ultrasonic waves generated by the transducer 360 enter the fuel absorber 332 and atomize (also referred to herein as "vaporize") at least a portion of the fuel absorbed by the fuel absorber 332. Atomizing the fuel absorbed within the fuel absorber 332 causes atomized droplets of the fuel to pass through an opening surrounding the transducer retaining ring 368 and into the equalization chamber 308. The atomized droplets form a fuel vapor that can be readily ignited within the engine 110.

As referenced above, the taper portion 210 of the main body sub-housing 204 may define the air intake module 216, which may extend from the top side 256*a* of the taper portion 210. The air intake module 216 may define the air inlet port 152 in fluid communication with the equalization chamber 308, and the air intake flap 390 may be movably attached to the air intake module 216 by the pin 392 such that the air intake flap 390 is movable between a first position (i.e., a closed position) in which the air intake flap 390 is closed and the air inlet port 152 is unable to receive air from the ambient and a second position (i.e., an open position) in which the air intake flap 390 is open and the air inlet port 152 is able to receive air from the ambient. In some implementations, the air intake flap 390 may be configured to open in response to a negative pressure being applied at the fuel outlet port 116.

An air intake flap tension spring 394 may have a first end 398*a* and a second end 398*b*, wherein the first end 398*a* is attached to a backwall 398 of the air inlet port 152 and the second end 398*b* is attached to the air intake flap 390. The air intake flap tension spring 394 may bias the air intake flap 390 in the first (i.e., closed) position.

Figure 5:
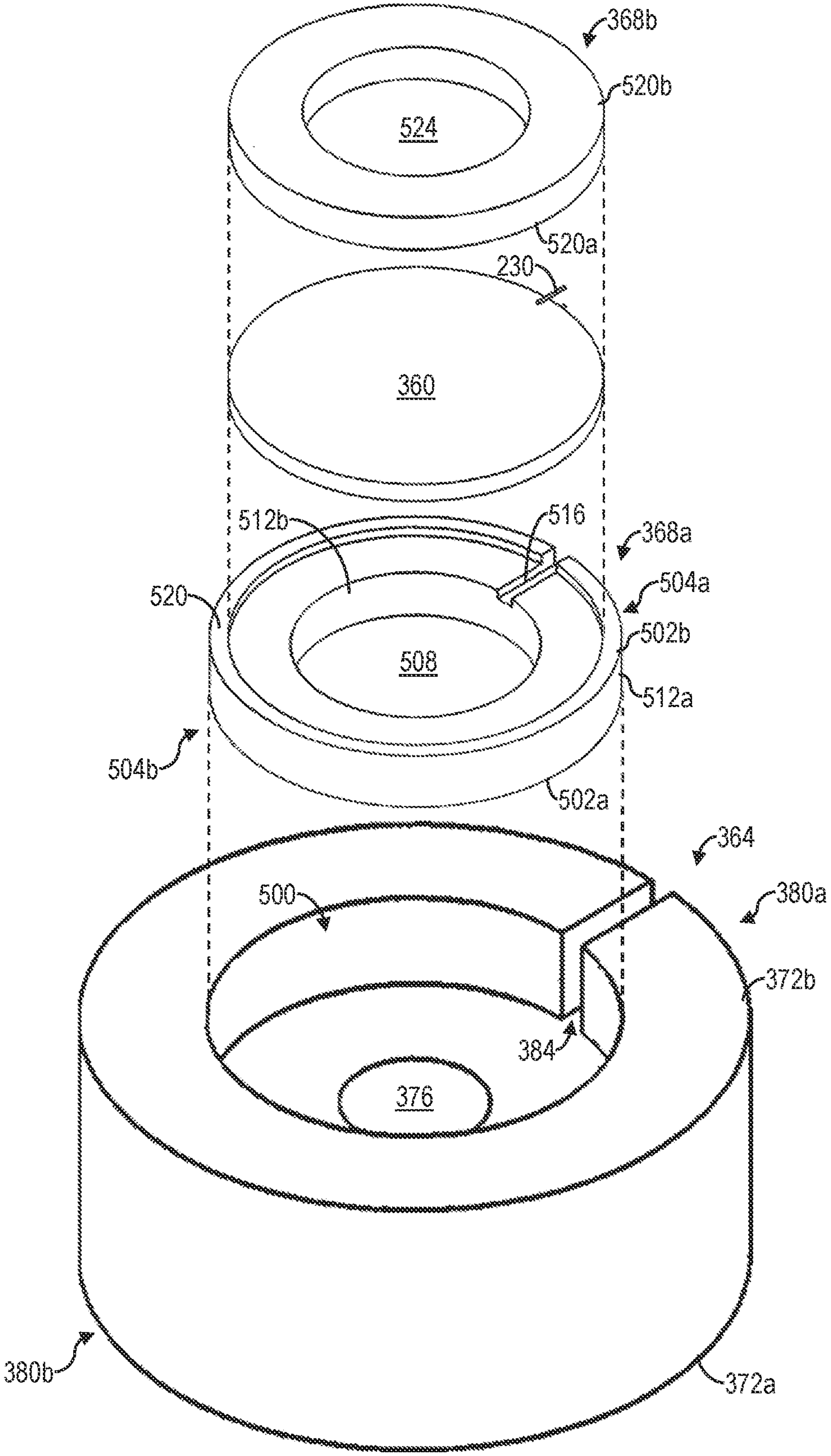
FIG. 5 is an exploded perspective view of a transducer holder shown in FIG. 4, the transducer holder having disposed therein a transducer retaining ring and an ultrasonic transducer.

Referring now to FIG. 5, the transducer retaining ring 368 may be sized to fit into an opening 500 formed in the transducer holder 364, the opening 500 being formed in the second side 372*b* of the transducer holder 364. That is, the opening 500 may be sized and dimensioned to receive the transducer retaining ring 368 and the transducer 360. The transducer holder 364 may be constructed of a durable material which can withstand the pressure within the fuel absorption chamber 304 and/or the equalization chamber 308, such as metal, for example.

The first portion 368*a* may have a first end 502*a*, a second end 502*b* opposing the first end 502*a*, a top side 504*a*, a bottom side 504*b* opposing the top side 504*a*, a hole 508 extending from the top side 504*a* to the bottom side 504*b*, an outer edge 512*a*, an inner edge 512*b* opposing the outer edge 512*a*, a transducer lead slot 516 disposed on the top side 504*a* adjacent to the second end 502*b* and extending from the outer edge 512*a* to the inner edge 512*b*, and a lip 520 formed on the outer edge 512*a* and extending from the second end 502*b*. The transducer lead slot 516 may be sized and dimensioned to receive the transducer leads 230. The second end 502*b* of the first portion 368*a*, subtracting the lip 520, may be sized and dimensioned to receive the transducer 360 and the second portion 268*b* of the transducer retaining ring 368.

The second portion 268*b* of the transducer retaining ring 368 may have a first end 520*a*, a second end 520*b* opposing the first end 520*a*, and a hole 524 extending from the first end 520*a* to the second end 520*b*.

Figure 6:
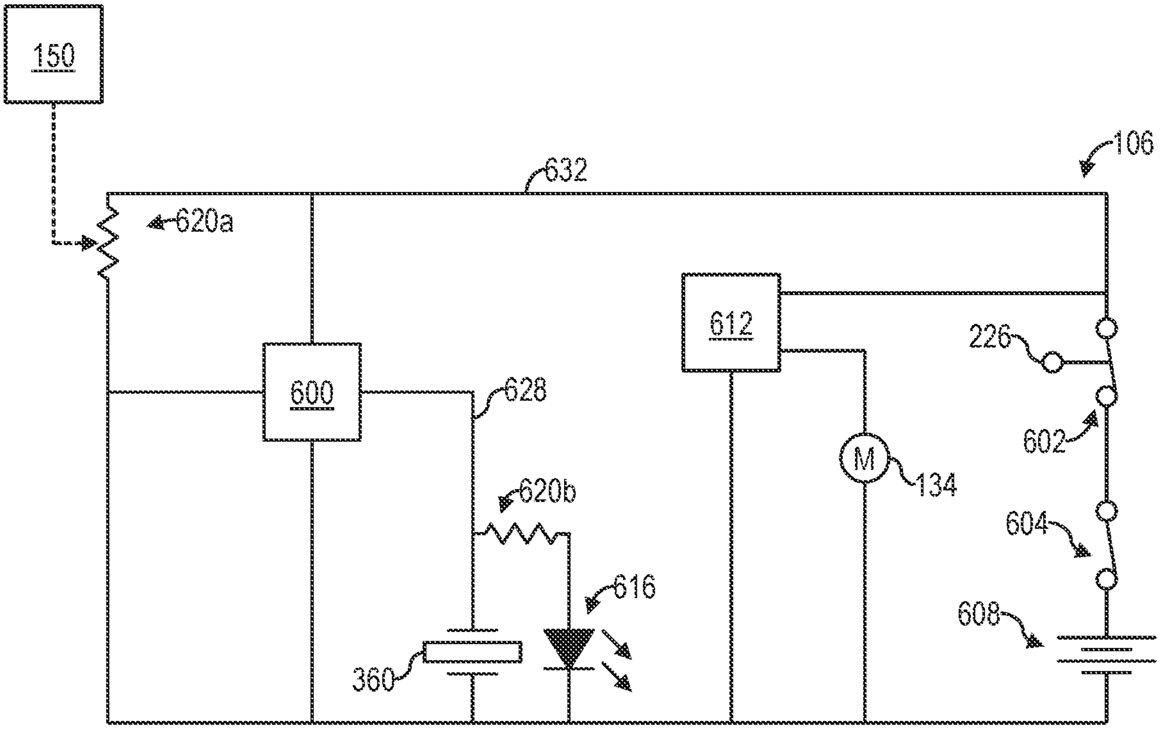
FIG. 6 is a wiring diagram of control circuitry shown in FIG. 1.

Referring now to FIG. 6, the control circuitry 106 may generally comprise: an ultrasonic transducer control circuit 600 (hereinafter the "transducer control circuit 600"); a fuel level sensor-actuated switch 602 (hereinafter the "fuel level switch 602"); a power switch 604; a power source 608; a fuel pump control circuit 612 (hereinafter the "pump control circuit 612"); and an indicator light 616. The control circuitry 106 may further comprise a plurality of resistors, including, for example, a first resistor 620*a* and a second resistor 620*b* (collectively the "resistors 620").

The transducer control circuit 600 may be configured to, responsive to detecting a trigger condition, provide a periodic ultrasonic transducer control signal 628 (hereinafter the "transducer control signal 628"), which may be a pulsed DC signal, for example, to actuate the transducer 360 to vibrate the fuel in the fuel absorber 332 at an ultrasonic frequency to change a state of the fuel from a liquid to a vapor. In some implementations, the transducer control circuit 600 may be configured to receive the fuel level signal 632 indicative of the fuel level of the fuel contained within the fuel absorption chamber 304 from the fuel level sensor 226. The transducer control circuit 600 may include a 555 timer, such as a 555-timer developed and manufactured by Texas Instruments Inc., having its principal place of business located in Dallas, Texas, and having the product designation LM555CN, for example. In some implementations, the trigger condition may be a user engaging an ignition switch of the engine 110.

The fuel level switch 602 may be configured to be actuated by the fuel level sensor 226 determining that the fuel level of the fuel within the fuel absorption chamber 304 is above a predetermined threshold and may be movable between a first (i.e., closed) position in which the circuit is closed and electrical current is able to flow to the fuel pump 134 and the pump control circuit 612 and a second (i.e., open) position in which the circuit is open and electrical current is unable to flow to the fuel pump 134 and the pump control circuit 612.

Thus, the control circuitry 106 may be configured to, responsive to the fuel level sensor 226 determining that the fuel level within the fuel absorption chamber 304 is above a predetermined threshold, deactuate the fuel pump 134. Conversely, the control circuitry 106 may be configured to, responsive to the fuel level sensor 226 determining that the fuel level within the fuel absorption chamber 304 is below the predetermined threshold, actuate the fuel pump 134.

In implementations where the system 100 is a gravity-fed system, the fuel may flow into the fuel absorption chamber 304 due to the force of gravity and may stop flowing into the fuel absorption chamber 304 due to an equalization of the pressure inside of the fuel absorption chamber 304.

The power switch 604 may be movable between a first position (i.e., an off position) in which the circuit is open and electrical current is unable to flow and a second position (i.e., an on position) in which the circuit is closed and electrical current is able to flow. Such current may be provided by the power source 608, which may be a 12 V automotive battery or supercapacitor, for example. Thus, the control circuitry 106 may be configured to connect to an automotive battery. In some implementations, the power source 608 may be configured to be charged by a generator or alternator (not shown).

The pump control circuit 612 may comprise circuitry configured to amplify electrical power provided to the fuel pump 134 so that the pressure at which the liquid fuel is provided by the fuel pump 134 to the fuel inlet port 114 is within an acceptable range based on the implementation of the engine 110. When the fuel level switch 602 is moved into the second (i.e., open) position by the fuel level sensor 226 determining that the fuel level of the fuel within the fuel absorption chamber 304 is above a predetermined threshold, the pump control circuit 612 may no longer receive electrical power and may cease to provide the amplified electrical power to the fuel pump 134.

The indicator light 616 may indicate whether the transducer control signal 628 is being provided to the transducer 360; that is, the indicator light 616 may indicate whether the transducer 360 is being supplied with an alternating current signal to cause the transducer 360 to generate ultrasonic energy.

In some implementations, the first resistor **620*a* may be a potentiometer having a variable resistance. In such implementations, adjusting the resistance of the first resistor 620*a* may have the effect of adjusting a frequency of the transducer control circuit 600. In some implementations, the resistance of the first resistor 620*a* may be adjusted by the user; in other implementations, the resistance of the first resistor 620*a* may be adjusted by the engine controller 150. In implementations where the engine controller 150 is a mechanical or electronic throttle sensor, the resistance of the first resistor 620*a* and the throttle of the engine 110 measured by the engine controller 150 may be inversely related; that is, the higher the throttle of the engine 110 as measured by the mechanical or electronic throttle sensor, the lower the resistance of the first resistor 620*a***.

While the resistances of the resistors 620 may differ from the exemplary values provided herein, such resistances may be selected such that a voltage measured across the transducer 360 is between 5.1 V and 5.3 V, for example. The transducer 360 being provided with a relatively low amount of power may have the effect of raising a temperature of the fuel passing through the tubular portion 208 of the main body sub-housing 204 by an amount between 0.1° F. and 0.2° F., for example.

Figure 7A:
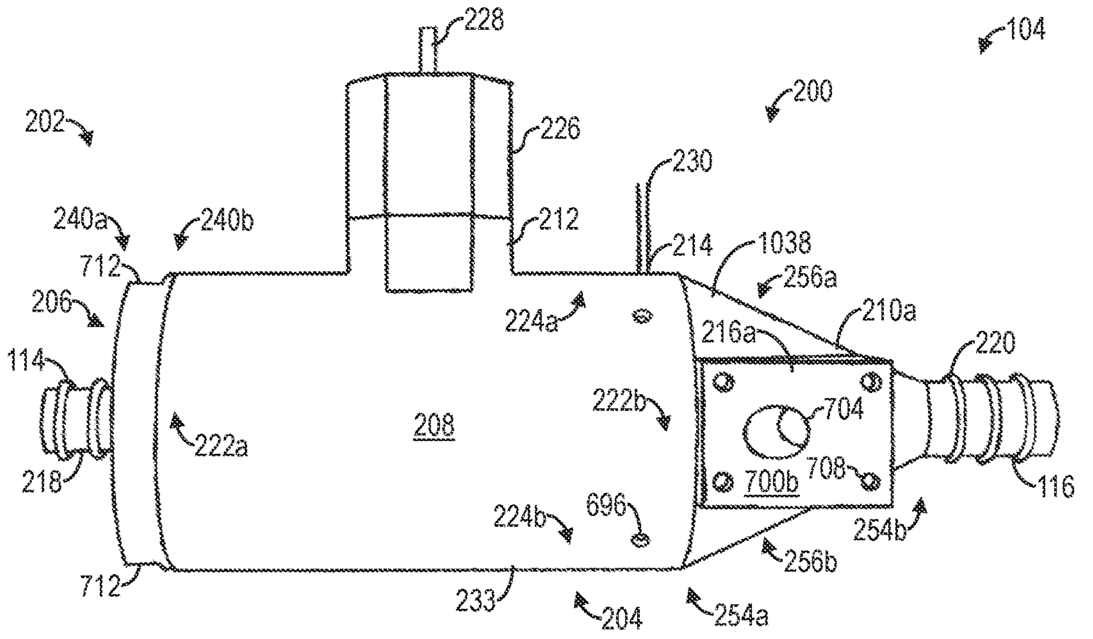
FIG. 7A is a side view of an alternative implementation of a fuel vaporizer shown in FIG. 1.
Figure 7B:
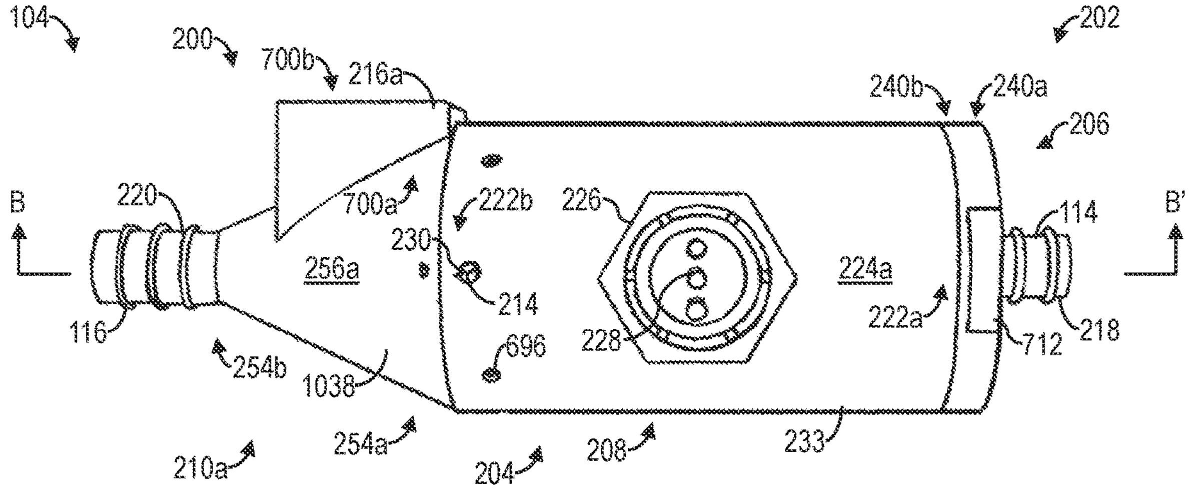
FIG. 7B is a top view of the alternative fuel vaporizer shown in FIG. 7A.

Referring now to FIGS. 7A-7B, shown therein is another implementation of the fuel vaporizer 104 that is constructed and used in a similar manner as the implementation discussed above, except as described below. In the implementation shown, the fuel vaporizer 104 is configured to be used in an electric pump-fed system. As shown in FIGS. 7A-7B, the fuel vaporizer 104 is provided with the air inlet port 152 (shown in FIG. 8) for receiving air from one of the air pump 154 and the air supply 160. As discussed further below, in this implementation, the taper portion 210 of the main body sub-housing 204 may be replaced with a fuel outlet sub-housing **210*a* that is removable from the tubular portion 208 of the main body sub-housing 204. Further, in the implementation shown in FIGS. 7A-7B, the air intake module 216 may be replaced with an air intake module 216*a* that is removable from the fuel outlet sub-housing 210*a*. As discussed further below, in this implementation, the main body sub-housing 204 may have one or more mounting hole 696 (hereinafter the "mounting holes 696") formed therein for securing the transducer holder 364 in place in between the fuel absorption chamber 304 and the equalization chamber 308**.

The air intake module **216*a* may have an inner surface 700*a*, an outer surface 700*b*, and an air intake channel 704 extending between the inner surface 700*a* and the outer surface 700*b*. The air inlet port 152 may be in fluid communication with the air intake channel 704 when the air intake module 216*a* is attached to the fuel outlet sub-housing 210*a*. As described further below, the air intake module 216*a* may further comprise one or more mounting hole 708 (hereinafter the "mounting holes 708") formed therein. As further shown in FIGS. 7A-7B, in some implementations, the fuel vaporizer 104 is not provided with the attachment assemblies 232**.

The air intake channel 704 may be positioned at an angle relative to the outer surface **700*b* of the air intake module 216*a*. In some implementations, the angle at which the air intake channel 704 is positioned relative to the outer surface 700*b* matches the angle at which the air inlet port 152 is formed in the fuel outlet sub-housing 210*a***.

As shown in FIGS. 7A-7B, the central portion 206 of fuel inlet sub-housing 202 may be generally circular in shape and may be provided with one or more flattened edge 712

(hereinafter the "flattened edges 712") configured to be gripped by a tool, such as a wrench, to assist in securing the fuel inlet sub-housing 202 to the main body sub-housing 204.

Figure 8:
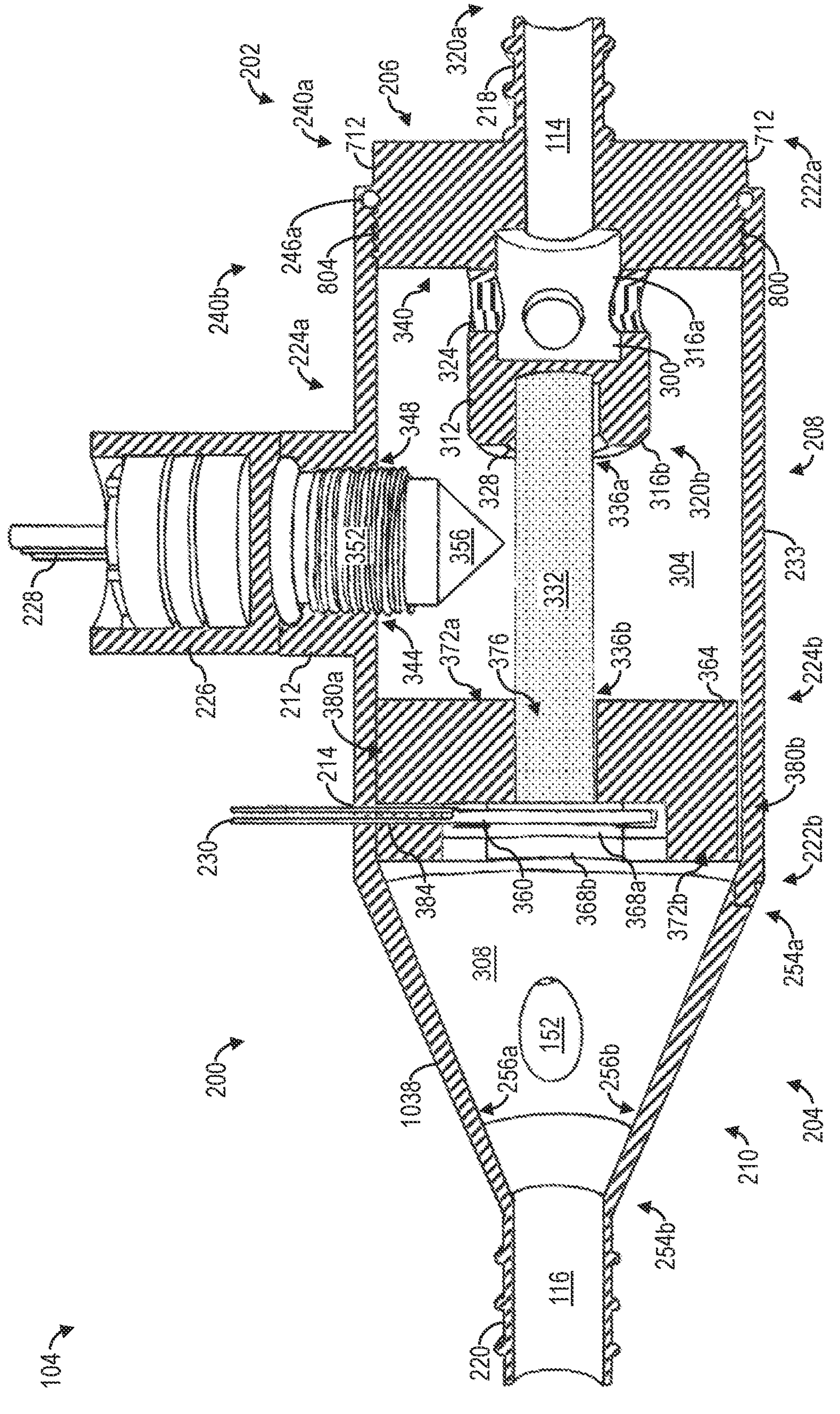
FIG. 8 is a partial cross-sectional view of the alternative fuel vaporizer shown in FIG. 7B, taken along the line B-B' and in the direction of the arrows.
Figure 9:
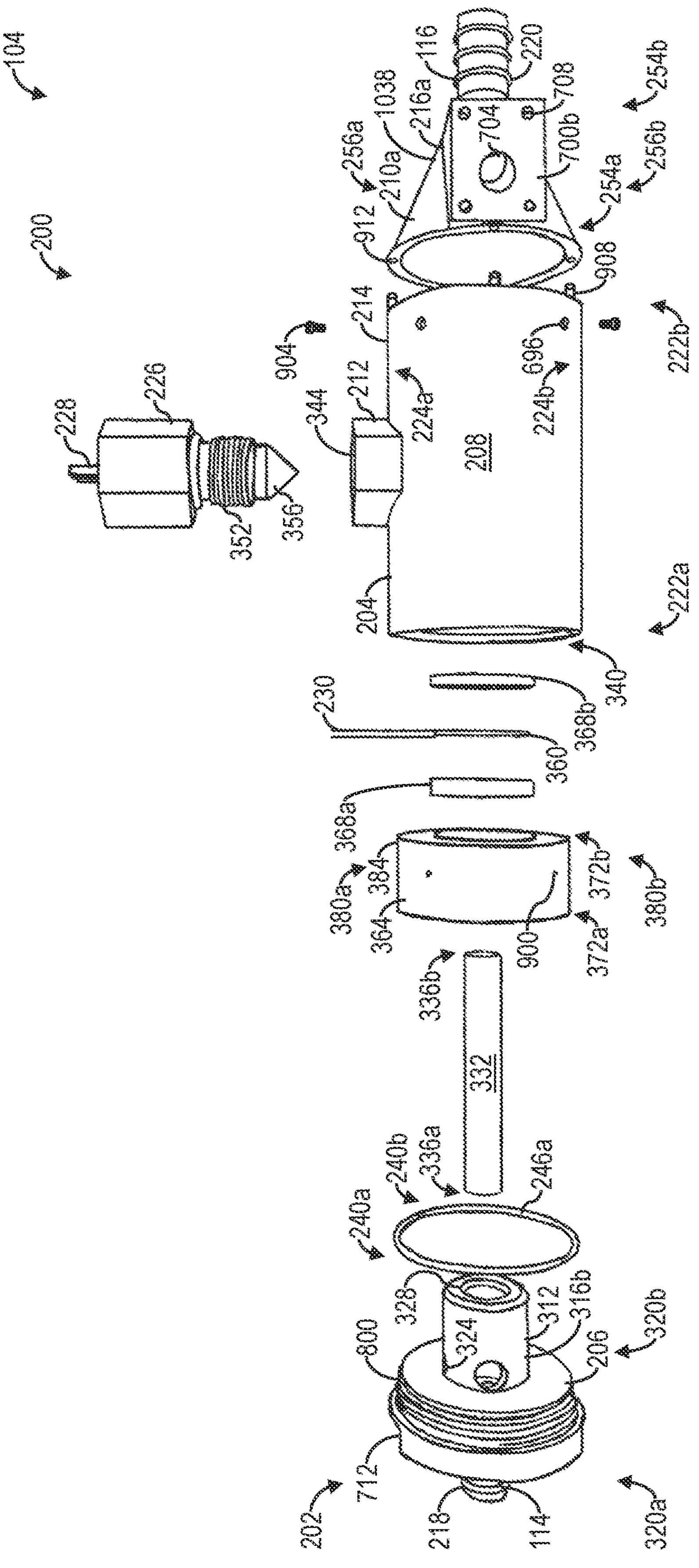
FIG. 9 is an exploded side view of the alternative fuel vaporizer shown in FIG. 7A.

Referring now to FIGS. 8-9, in implementations where the fuel vaporizer 104 is not provided with the attachment assemblies 232, the second side 240*b* of the central portion 206 of the fuel inlet sub-housing 202 may have a threaded portion 800, and the inlet end 222*a* of the tubular portion 208 of the main body sub-housing 204 may have a threaded inner surface 804 configured to engage the threaded portion 800 of the fuel inlet sub-housing 202. As shown in FIG. 9, in such implementations, the gasket 246 may be replaced with an O-ring 246*a*.

In this implementation, the transducer holder 364 is provided with one or more mounting hole 900 (hereinafter the "mounting holes 900") formed therein for securing the transducer holder 364 in place between the fuel absorption chamber 304 and the equalization chamber 308. The mounting holes 900 formed in the transducer holder 364 and the mounting holes 696 formed in the main body sub-housing 204 may be positioned such that, when the transducer holder 364 is in place between the fuel absorption chamber 304 and the equalization chamber 308, mounting screws 904 may be driven through the mounting holes 696 and into the mounting holes 900, thereby securing the transducer holder 364 in place between the fuel absorption chamber 304 and the equalization chamber 308. For purposes of clarity, only one of the mounting holes 900 and only one of the mounting screws 904 is labeled with a reference character.

As shown in FIG. 9, the main body sub-housing 204 may include one or more alignment pin 908 (hereinafter the "alignment pins 908") extending from the outlet end 222*b* of the main body sub-housing 204. Similarly, the fuel outlet sub-housing 210*a* may define one or more alignment hole 912 (hereinafter the "alignment holes 912") in the inlet end 254*a* of the fuel outlet sub-housing 210*a*. Each of the alignment pins 908 may correspond to a particular one of the alignment holes 912, and each of the alignment holes 912 may be configured to receive a particular one of the alignment pins 908, to assist in aligning the fuel outlet sub-housing 210*a* with the main body sub-housing 204 during construction of the fuel vaporizer 104. For purposes of clarity, only one of the alignment pins 908 and only one of the alignment holes 912 is labeled with a reference character.

Figure 10:
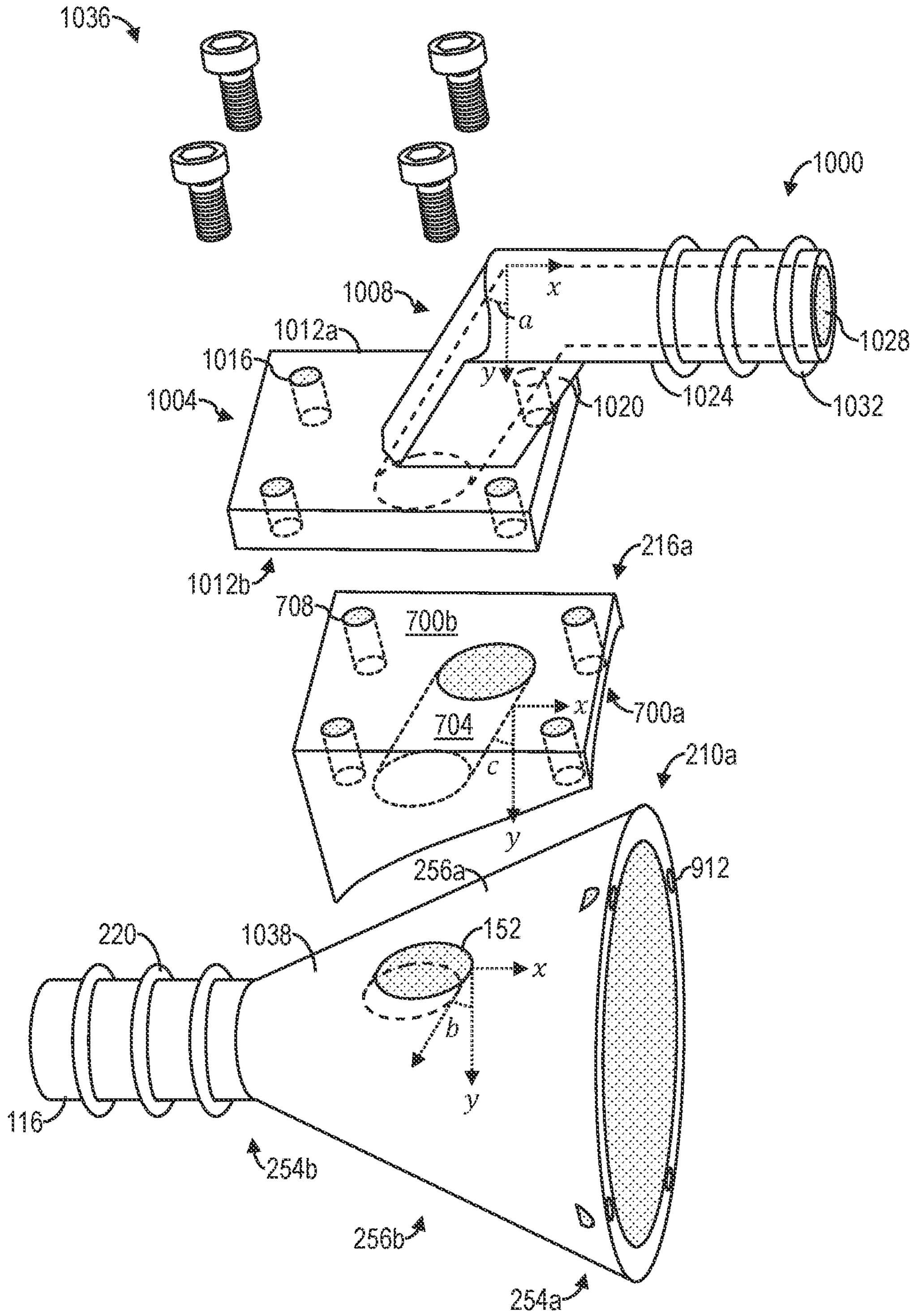
FIG. 10 is a partial exploded side view of the alternative fuel vaporizer shown in FIG. 7A, wherein the alternative fuel vaporizer is provided with an air pressure attachment.
Figure 11A:
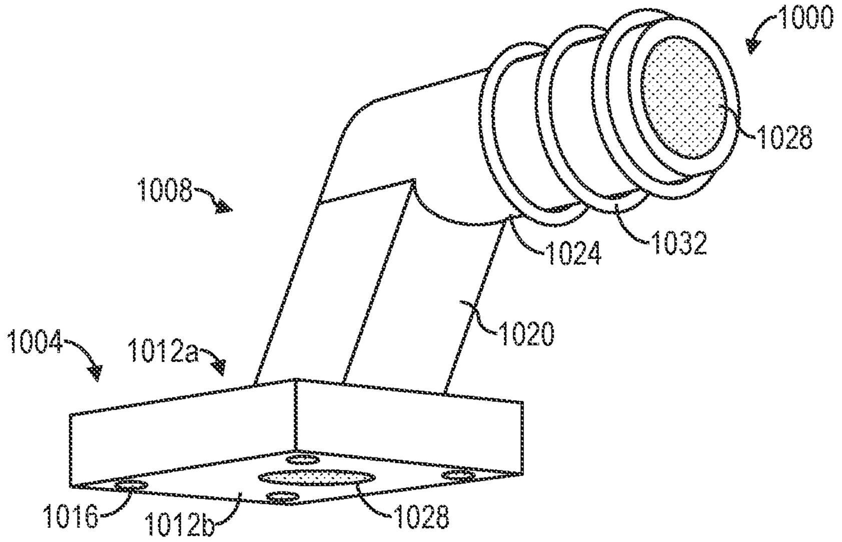
FIG. 11A is a perspective view of the air pressure attachment shown in FIG. 10.
Figure 11B:
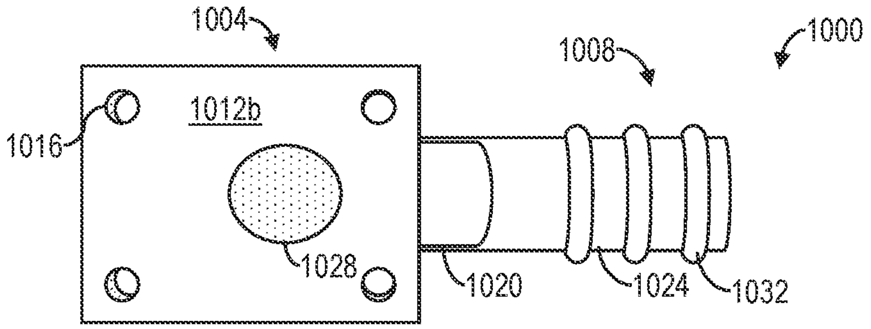
FIG. 11B is a bottom view of the air pressure attachment shown in FIG. 10.

Referring now to FIGS. 10 and 11A-11B, in some implementations, an air pressure attachment 1000 may be configured to be attached to the air intake module 216*a*, the air pressure attachment 1000 being configured to connect to a positive pressure line in order to modify a pressure within the equalization chamber 308. The air pressure attachment 1000 may have a mounting portion 1004 and an inlet portion 1008. The mounting portion 1004 may have a top surface 1012*a*, a bottom surface 1012*b*, and one or more mounting hole 1016 (hereinafter the "mounting holes 1016") extending from the top surface 1012*a* to the bottom surface 1012*b*. The inlet portion 1008 may have an upright portion 1020 extending from the top surface 1012*a* of the mounting portion 1004 and an outwardly extending portion 1024 extending from the upright portion 1020. A conduit 1028 may extend through the outwardly extending portion 1024, through the upright portion 1020, and from the top surface 1012*a* of the mounting portion 1004 to the bottom surface 1012*b* of the mounting portion 1004. A portion of the outwardly extending portion 1024 may have a ribbed outer surface 1032 configured to assist in securing the air pressure attachment 1000 to one of the air pump outlet 156, the air supply outlet 162, and/or the air lines 164.

The mounting holes 708 of the air intake module 216*a* and the mounting holes 1016 of the air pressure attachment 1000 may be positioned such that one or more mounting screw 1036 (hereinafter the "mounting screws 1036") may be driven through the mounting holes 1016 and into the mounting holes 708, thereby securing the air pressure attachment 1000 to the air intake module 216*a*.

The upright portion 1020 and the conduit 1028 formed therein may be positioned at an angle a relative to the top surface 1012*a* or the bottom surface 1012*b* of the mounting portion 1004. In some implementations, the angle a at which the upright portion 1020 and the conduit 1028 are positioned relative to the mounting portion 1004 matches the angle b of the air inlet port 152 formed in the fuel outlet sub-housing 210*a* and the angle c of the air intake channel 704 formed in the air intake module 216*a*. The angle b of the air inlet port 152 formed in the fuel outlet sub-housing 210*a* may be between 5° and 45° relative to an outer surface 1038 of the fuel outlet sub-housing 210*a*.

The air intake module 216*a* may be attached to the fuel outlet sub-housing 210*a* by welding the air intake module 216*a* to the fuel outlet sub-housing 210*a*, for example.

Figure 12:
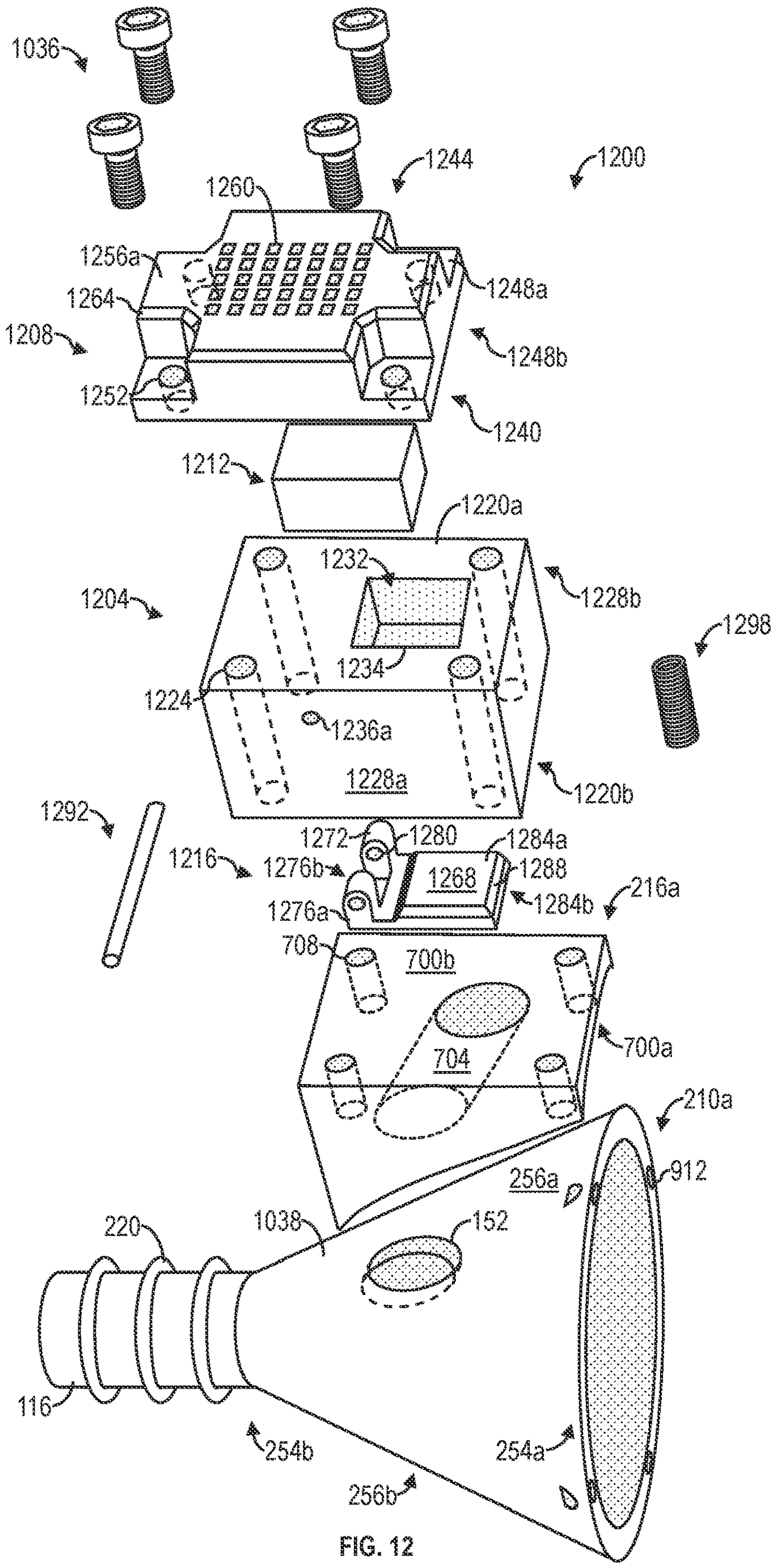
FIG. 12 is a partial exploded side view of the alternative fuel vaporizer shown in FIG. 7A, wherein the alternative fuel vaporizer is provided with a vacuum attachment.
Figure 13A:
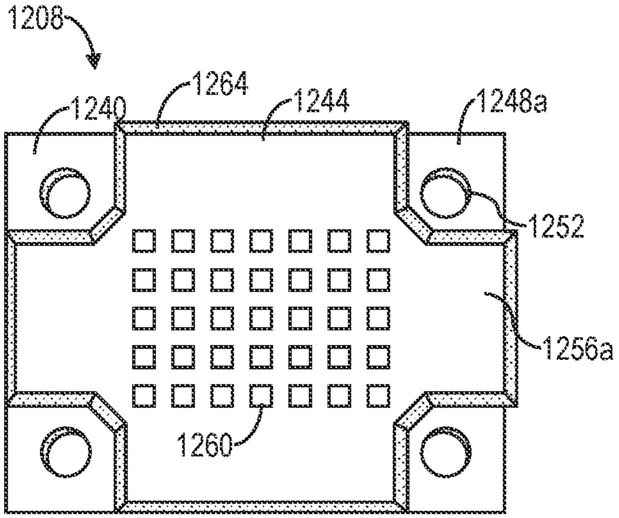
FIG. 13A is a top view of a cap portion of the vacuum attachment shown in FIG. 12.
Figure 13B:
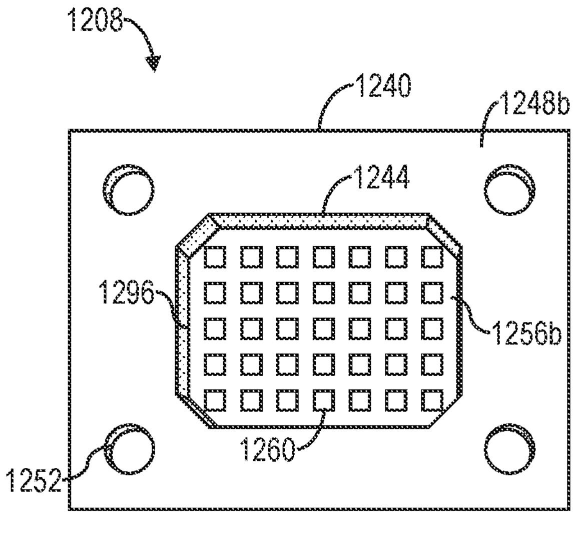
FIG. 13B is a bottom view of the cap portion of the vacuum attachment shown in FIG. 12.

Referring now to FIGS. 12 and 13A-B, in some implementations, a vacuum attachment 1200 may be configured to be attached to the air intake module 216*a*, vacuum attachment 1200 being configured to connect to a negative pressure line in order to modify a pressure within the equalization chamber 308. The vacuum attachment 1200 may have a base portion 1204, a cap portion 1208, an air filter 1212, and a base portion flap 1216.

The base portion 1204 may have a top surface 1220*a*, a bottom surface 1220*b*, one or more mounting hole 1224 (hereinafter the "mounting holes 1224") extending from the top surface 1220*a* to the bottom surface 1220*b*, a first side 1228*a*, and a second side 1228*b*. As discussed further below, the base portion 1204 may define an inner cavity 1232 (shown in FIGS. 14A-14C). The top surface 1220*a* of the base portion 1204 of the vacuum attachment 1200 may have an opening 1234 formed therein in fluid communication with the inner cavity 1232. The opening 1234 may be sized and dimensioned such that the filter 1212 may not fit into the opening 1234; that is, the filter 1212 may be sized and dimensioned larger than the opening 1234. Further, a first hole 1236*a* may extend from the first side 1228*a* to the inner cavity 1232 and a second hole 1236*b* may extend from the second side 1228*b* to the inner cavity 1232.

The cap portion 1208 may have a mounting portion 1240 and an outwardly extending portion 1244. The mounting portion 1240 may have a top surface 1248*a*, a bottom surface 1248*b*, and one or more mounting hole 1252 (hereinafter the "mounting holes 1252") extending from the top surface 1248*a* to the bottom surface 1248*b*. The outwardly extending portion 1244 may extend from the top surface 1248*a* of the mounting portion 1240. The outwardly extending portion 1244 may have a top surface 1256*a*, a bottom surface 1256*b*, and one or more vent hole 1260 extending from the top surface 1256*a* to the bottom surface 1256*b*. A portion of the top surface 1256*a* of the outwardly extending portion 1244 may have a chamfer 1264. A portion 1296 of the bottom surface 1248*b* of the mounting portion 1240 may be recessed from the bottom surface 1248*b*, and the portion 1296 may be sized and dimensioned to accommodate the air filter 1212.

The air filter 1212 may be sized and dimensioned to be positioned in the inner cavity 1232 of the base portion 1204 and may be configured to remove impurities from the air. The air filter 1212 may be constructed using foam, cotton, fiberglass, and/or combinations thereof.

The mounting holes 708 of the air intake module 216*a*, the mounting holes 1224 of the base portion 1204, and the mounting holes 1252 of the cap portion 1208 may be positioned such that the mounting screws 1036 may be driven through the mounting holes 1252 and the mounting holes 1224 and into the mounting holes 708, thereby securing the vacuum attachment 1200 to the air intake module 216*a*.

The base portion flap 1216 may have a cover portion 1268 and one or more hinge portion 1272 (hereinafter the "hinge portions 1272") extending from the cover portion 1268, each of the hinge portions 1272 having a first side 1276*a*, a second side 1276*b*, and a hole 1280 extending from the first side 1276*a* to the second side 1276*b*. The cover portion 1268 may have a top surface 1284*a* and a bottom surface 1284*b*, and a portion of the top surface 1284*a* may have a chamfer 1288.

The hole 1280 in each of the hinge portions 1272, the first hole 1236*a* in the base portion 1204, and the second hole 1236*b* in the base portion 1204 may be positioned such that a pin 1292 may be driven through the hole 1280, the first hole 1236*a*, and the second hole 1236*b*, thereby movably securing the base portion flap 1216 to the base portion 1204.

The base portion flap 1216 may be movably secured to the base portion 1204 by the pin 1292 such that the base portion flap 1216 is movable between a first position (i.e., a closed position) in which the base portion flap 1216 is closed and the opening 1234 of the base portion 1204 is unable to receive air and a second position (i.e., an open position) in which the base portion flap 1216 is open and the opening 1234 of the base portion 1204 is able to receive air.

A base portion flap tension spring 1298 may be disposed within the base portion 1204 and may be configured to bias the base portion flap 1216 in the first position (i.e., the closed position) such that the base portion flap 1216 may move into the second position (i.e., the open position) in response to a negative pressure being applied at the fuel outlet port 116. The base portion 1204 with the base portion flap 1216 movably secured in place may function as a flap-style check valve, wherein air is allowed to flow into the opening 1234 of the base portion 1204 and is not allowed to flow out of the opening 1234 of the base portion 1204.

Figure 14A:
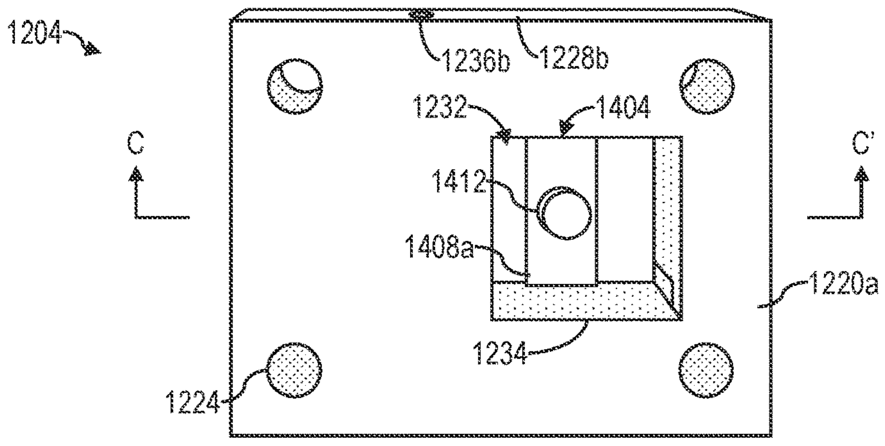
FIG. 14A is a top view of a base portion of the vacuum attachment shown in FIG. 12.
Figure 14B:
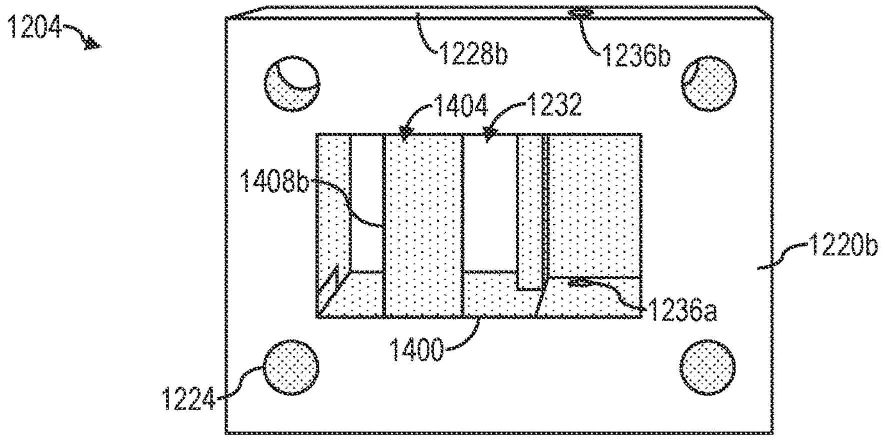
FIG. 14B is a bottom view of the base portion of the vacuum attachment shown in FIG. 12.
Figure 14C:
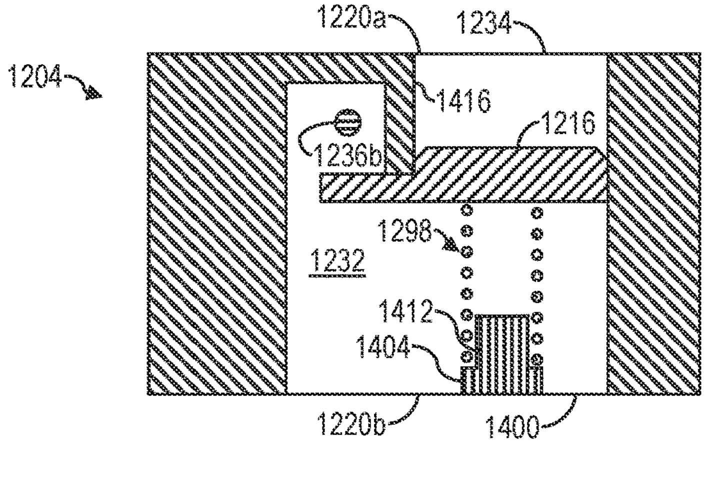
FIG. 14C is a cross-sectional view of the base portion of the vacuum attachment shown in FIG. 12, taken along the line C-C' and in the direction of the arrows.

Referring now to FIGS. 14A-14C, the bottom surface 1220*b* of the base portion 1204 of the vacuum attachment 1200 may have an opening 1400 in fluid communication with the inner cavity 1232. A bar 1404 may be positioned adjacent to the opening 1400, the bar 1404 having a top surface 1408*a*, a bottom surface 1408*b*, and a protrusion 1412 extending from the top surface 1408*a* and into the inner cavity 1232. The protrusion 1412 may be sized and dimensioned such that the base portion flap tension spring 1298 may be held in position by the protrusion 1412. Further, a protrusion 1416 may extend from the top surface 1220*a* of the base portion 1204 and into the inner cavity 1232.

In operation, a user or the engine controller 150 moves the power switch 604 from the first position (i.e., the off position) to the second position (i.e., the on position), thereby closing the circuit such that the power source 608 may provide electrical power to the control circuitry 106, including the transducer control circuit 600 and the pump control circuit 612. The transducer control circuit 600 then provides the transducer control signal 628 to the transducer 360 and the indicator light 616 via the second resistor 620*b*, while the pump control circuit 612 receives the fuel level signal 632 from the fuel level sensor 226, determines that the fuel level of the fuel in the fuel absorption chamber 304 is below the predetermined threshold, and actuates the fuel pump 134. The fuel pump 134 then provides the fuel under pressure to the fuel inlet port 114, in some embodiments passing through the fuel filter 122 prior to entering the fuel inlet port 114. The fuel then flows through the fuel introduction chamber 300 and into the fuel absorption chamber 304, where at least a portion of the fuel is absorbed by the fuel absorber 332, which draws the fuel toward the transducer 360. The fuel level of the fuel in the fuel absorption chamber 304 is measured by the fuel level sensor 226, and the fuel level signal 632 indicative of the fuel level is provided to the transducer control circuit 600.

Once a predetermined amount of the fuel is contained within the fuel absorption chamber 304, the fuel level sensor 226 determines that the fuel level within the fuel level within the fuel absorption chamber 304 is above a predetermined threshold. Responsive to the fuel level sensor 226 determining that the fuel level within the fuel absorption chamber 304 is above the predetermined threshold, the fuel level switch 602 moves from the first position (i.e., the closed position) to the second position (i.e., the open position), thereby opening the circuit and stopping electrical power from flowing to the fuel pump 134 (i.e., deactuating the fuel pump 134) and the pump control circuit 612.

In some implementations, the predetermined threshold is an amount of fuel within the fuel absorption chamber 304 such that a portion of the probe portion 356 of the fuel level sensor 226 is submerged in the fuel. In some implementations, the predetermined threshold is an amount of fuel within the fuel absorption chamber 304 such that the fuel absorber 332 is completely submerged in the fuel. In some implementations, the predetermined threshold is an amount of fuel that fills two-thirds of the volume of the fuel absorption chamber 304. The predetermined threshold may be selected at least in part in order to delay the deactuation of the fuel pump 134 and/or reduce an amount of pressure contained within the fuel absorption chamber 304 for extended periods of time.

Responsive to the fuel level switch 602 moving from the first position (i.e., the closed position) to the second position (i.e., the open position), the transducer control circuit 600 begins providing the transducer control signal 628 to the transducer 360 to actuate the transducer 360, thereby causing the transducer 360 to vibrate the fuel absorbed by the fuel absorber 316 at an ultrasonic frequency to change the state of the fuel from a liquid to a vapor. The vaporized fuel passes through a gap formed between the transducer retaining ring 368 and the transducer 360 and flows into the equalization chamber 308.

In some embodiments, when the engine 110 creates a vacuum to draw in the vaporized fuel, the negative pressure being applied at the fuel outlet port 116 causes the air intake flap 390 or the base portion flap 1216 to move from the first position (i.e., the closed position) to the second position (i.e., the open position), thereby allowing air from the ambient to enter the air inlet port 152 and flow into the equalization chamber 308. The vaporized fuel mixes with the air from the ambient to form a fuel-air mixture as the fuel-air mixture is drawn out of the fuel outlet port 116. In other embodiments, the air is not from the ambient, but is provided instead by the air pressure attachment 1000 receiving the air from one of the air supply 160 and the air pump 154.

The fuel-air mixture then flows into one of the engine inlet 118 of the engine 110 and the carburetor inlet 130 of the carburetor 128. After the fuel-air mixture enters the combustion chamber 120 of the engine 110, the engine 110 combusts the fuel-air mixture in order to drive the engine 110.

The user may then adjust a throttle position of the engine 110 to a desired level. In some implementations, this throttle position may be detected by a throttle sensor, and in response, the engine controller 150 may provide a resistance signal to the control circuitry 106 indicative of a resistance level based on the throttle position. The resistance signal may adjust the resistance of the first resistor 620*a*, which may in turn adjust the frequency of the transducer control signal 628 based on the throttle position.

The number of devices and/or components illustrated in the drawings is provided for explanatory purposes. In practice, the system 100 may comprise additional devices and/or components, fewer devices and/or components, different devices and/or components, or differently arranged devices and/or components than are shown in the drawings. Furthermore, two or more of the devices and/or components illustrated in the drawings may be implemented within a single device or component, or a single device or component illustrated in the drawings may be implemented as multiple devices and/or components. Additionally, or alternatively, one or more of the devices and/or components of the system 100 may perform one or more function described as being performed by another one or more of the devices and/or components of the system 100.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A fuel vaporizer, comprising:

a housing defining a fuel absorption chamber, an equalization chamber, a fuel inlet port in fluid communication with the fuel absorption chamber, and a fuel outlet port in fluid communication with the equalization chamber;

a fuel absorber positioned within the fuel absorption chamber; and an ultrasonic transducer in contact with the fuel absorber and positioned between the fuel absorption chamber and the equalization chamber.

2. The fuel vaporizer of claim 1, wherein the fuel inlet port is configured to receive fuel from a fuel supply.

3. The fuel vaporizer of claim 1, further comprising a fuel level sensor configured to determine a fuel level within the fuel absorption chamber.

4. The fuel vaporizer of claim 3, further comprising a fuel pump in fluid communication with the fuel inlet port, the fuel pump being configured to provide fuel under pressure to the fuel inlet port.

5. The fuel vaporizer of claim 4, further comprising control circuitry configured to, responsive to the fuel level sensor determining that the fuel level within the fuel absorption chamber is above a predetermined threshold, deactuate the fuel pump.

6. The fuel vaporizer of claim 5, wherein the circuitry is further configured to, responsive to the fuel level sensor determining that the fuel level within the fuel absorption chamber is above the predetermined threshold, actuate the ultrasonic transducer to vibrate fuel in the fuel absorber at an ultrasonic frequency to change a state of the fuel from a liquid to a vapor.

7. The fuel vaporizer of claim 5, wherein the circuitry is further configured to, responsive to the fuel level sensor determining that the fuel level within the fuel absorption chamber is below the predetermined threshold, actuate the fuel pump.

8. The fuel vaporizer of claim 7, wherein the circuitry is further configured to, responsive to the fuel level sensor determining that the fuel level within the fuel absorption chamber is below the predetermined threshold, deactuate the ultrasonic transducer.

9. The fuel vaporizer of claim 1, wherein the fuel absorber is constructed using an absorbent material.

10. The fuel vaporizer of claim 1, wherein the fuel outlet port is configured to connect to one of an intake manifold of an automotive engine and an inlet hose of a carburetor.

11. The fuel vaporizer of claim 1, further comprising a fuel filter in fluid communication with the fuel inlet port.

12. The fuel vaporizer of claim 1, further comprising control circuitry configured to actuate the ultrasonic transducer to vibrate fuel in the fuel absorber at an ultrasonic frequency to change a state of the fuel from a liquid to a vapor.

13. The fuel vaporizer of claim 12, wherein the control circuitry is configured is connect to an automotive battery.

14. The fuel vaporizer of claim 1, wherein the housing further defines an air inlet port in fluid communication with the equalization chamber, the air inlet port being configured to connect to one of a positive pressure line and a negative pressure line.

15. The fuel vaporizer of claim 11, further comprising a three-way valve positioned between the fuel filter and the fuel inlet port, the three-way valve having a first valve port in fluid communication with the fuel filter, a second valve port in fluid communication with the fuel inlet port, and a third valve port configured to connect to one of an intake manifold of an automotive engine and an inlet hose of a carburetor.

16. The fuel vaporizer of claim 1, further comprising a transducer retaining ring surrounding the ultrasonic transducer and positioned between the fuel absorption chamber and the equalization chamber.

17. The fuel vaporizer of claim 16, wherein the transducer retaining ring is constructed using a material selected from the group consisting essentially of silicone, nitrile rubber, cork, and neoprene.

18. The fuel vaporizer of claim 1, wherein the housing further defines an air inlet port in fluid communication with the equalization chamber.

19. The fuel vaporizer of claim 18, further comprising an air pressure attachment having a conduit in fluid communication with the air inlet port, the air pressure attachment being configured to connect to a positive pressure line.

20. The fuel vaporizer of claim 18, further comprising a vacuum attachment having a conduit in fluid communication with the air inlet port, the vacuum attachment being configured to connect to a negative pressure line.

* * * * *